(12) United States Patent
Goepfert

(10) Patent No.: US 12,529,050 B2
(45) Date of Patent: Jan. 20, 2026

(54) MULTISPECIFIC ANTIBODY SCREENING METHOD USING RECOMBINASE MEDIATED CASSETTE EXCHANGE

(71) Applicant: Hoffmann-La Roche Inc., Little Falls, NJ (US)

(72) Inventor: Ulrich Goepfert, Penzberg (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 1163 days.

(21) Appl. No.: 17/239,398

(22) Filed: Apr. 23, 2021

(65) Prior Publication Data

US 2021/0388341 A1 Dec. 16, 2021

Related U.S. Application Data

(63) Continuation of application No. PCT/EP2019/078972, filed on Oct. 24, 2019.

(30) Foreign Application Priority Data

Oct. 26, 2018 (EP) .................................. 18202732

(51) Int. Cl.
| | |
|---|---|
| C12N 15/10 | (2006.01) |
| C07K 16/00 | (2006.01) |
| C12N 15/85 | (2006.01) |

(52) U.S. Cl.
CPC .......... *C12N 15/1082* (2013.01); *C07K 16/00* (2013.01); *C12N 15/85* (2013.01); *C07K 2317/31* (2013.01); *C07K 2317/66* (2013.01)

(58) Field of Classification Search
None
See application file for complete search history.

(56) References Cited

U.S. PATENT DOCUMENTS

| | | | |
|---|---|---|---|
| 6,004,941 A | 12/1999 | Bujard et al. | |
| 6,270,989 B1 | 8/2001 | Treco et al. | |
| 6,277,608 B1 | 8/2001 | Hartley et al. | |
| 6,410,329 B1 | 6/2002 | Hansen et al. | |
| 6,451,598 B1 | 9/2002 | Goldsmith et al. | |
| 6,773,920 B1 | 8/2004 | Dalby et al. | |
| 7,011,974 B2 | 3/2006 | Wood et al. | |
| 7,297,543 B2 | 11/2007 | Zoller et al. | |
| 7,332,333 B2 | 2/2008 | Bremel et al. | |
| 7,364,903 B2 | 4/2008 | Zoller et al. | |
| 7,368,285 B2 | 5/2008 | Zoller et al. | |
| 7,371,542 B2 | 5/2008 | Ivanova et al. | |
| 7,521,240 B2 | 4/2009 | Perkins et al. | |
| 7,906,328 B2 | 3/2011 | Zoller et al. | |
| 7,947,496 B2 | 5/2011 | DuBridge et al. | |
| 8,313,925 B2 | 11/2012 | Gregory et al. | |
| 8,597,912 B2 | 12/2013 | Collingwood et al. | |
| 8,685,737 B2 | 4/2014 | Serber et al. | |
| 8,980,579 B2 | 3/2015 | Mauro et al. | |
| 9,175,278 B2 | 11/2015 | Song | |
| 9,290,778 B2 | 3/2016 | Slavcev et al. | |
| 9,816,110 B2 | 11/2017 | Shin et al. | |
| 10,113,207 B2 | 10/2018 | Wang | |
| 10,337,000 B2 | 7/2019 | Bradley et al. | |

(Continued)

FOREIGN PATENT DOCUMENTS

| | | |
|---|---|---|
| AU | 2002225534 B2 | 9/2006 |
| AU | 2005263331 B1 | 5/2011 |

(Continued)

OTHER PUBLICATIONS

Bahr, S., et al., "Engineering Conferences International ECI Digital Archives Development of a platform expression system using targeted integration in Chinese Hamster Ovary cells" Poster Cell Culture Engineering XVI, Tampa, Florida, pp. 1-2 (May 6-11, 2018) https://dc.engconfintl.org/ccexvi/120/.

Carver, J., et al., "Maximizing antibody production in a targeted integration host by optimization of subunit gene dosage and position" Biotechnol Prog 36(4):e2967 (1-10) (Jul. 1, 2020).

Farber-Schwarz, A.,, "Serum Albumin and its Interaction with the Neonatal Fc Receptor (FcRn): Characterization of the Albumin/FcRn—binding Mechanism" Institut fur Zellbiologie und Immunologie der Universitat Stuttgart—DE (PhD Dissertation Thesis),: 1-152 (Jan. 1, 2013).

Gurumurthy, C., et al., "Generating mouse models for biomedical research: technological advances" Dis Model Mech 12(1):DMM029462 (1-10) (Jan. 8, 2019).

(Continued)

*Primary Examiner* — Heather Calamita
*Assistant Examiner* — Jessica D Parisi
(74) *Attorney, Agent, or Firm* — GENENTECH, INC.

(57) ABSTRACT

Herein is reported a method for preparing a recombinant host cell library expressing bispecific antibodies using targeted integration into a host cell comprising an exogenous nucleotide sequence integrated at a site within a locus of the genome of the host cell, wherein the exogenous nucleotide sequence comprises a first and a second recombination recognition sequence flanking at least one first selection marker, and a third recombination recognition sequence located between the first and the second, recombination recognition sequence, and all the recombination recognition sequences are different whereby the host cell is transfected with a library of first vectors each comprising two recombination recognition sequences matching the first and the third recombination recognition sequence on the integrated exogenous nucleotide sequence and flanking two exogenous nucleotide sequences and at least one second selection marker, and a library of second vectors each comprising two recombination recognition sequences matching the second and the third recombination recognition sequence on the integrated exogenous nucleotide sequence and flanking at least two further exogenous nucleotide sequences; wherein one of the four exogenous nucleotide sequences encode a first light chain, one a second light chain, one a first heavy chain and one a second heavy chain of the bispecific antibody.

13 Claims, 6 Drawing Sheets

Specification includes a Sequence Listing.

(56) References Cited

U.S. PATENT DOCUMENTS

| | | |
|---|---|---|
| 10,369,197 B2 | 8/2019 | Liu et al. |
| 10,377,990 B2 | 8/2019 | Lin et al. |
| 11,530,277 B2 * | 12/2022 | Babb ............... C12N 15/85 |
| 2009/0042297 A1 | 2/2009 | George, Jr. et al. |
| 2012/0142049 A1 | 6/2012 | Belmont |
| 2015/0167010 A1 | 6/2015 | Lamb et al. |
| 2016/0208284 A1 | 7/2016 | Huelsmann et al. |
| 2018/0003696 A1 | 1/2018 | Sharei et al. |
| 2020/0169731 A1 | 5/2020 | Xu et al. |
| 2021/0024952 A1 | 1/2021 | Huelsmann et al. |
| 2021/0139561 A1 | 5/2021 | Auer et al. |
| 2021/0403953 A1 | 12/2021 | Shen et al. |
| 2022/0119482 A1 | 4/2022 | Schlothauer et al. |
| 2022/0169729 A1 | 6/2022 | Auer et al. |
| 2022/0169730 A1 | 6/2022 | Auer et al. |
| 2022/0170049 A1 | 6/2022 | Auslaender |

FOREIGN PATENT DOCUMENTS

| | | |
|---|---|---|
| AU | 2007254508 B2 | 7/2012 |
| AU | 2012205210 B2 | 8/2012 |
| AU | 2009201482 B2 | 1/2013 |
| CA | 2045175 C1 | 3/2003 |
| CN | 100381573 C | 4/2008 |
| CN | 104011075 A | 8/2014 |
| CN | 104818253 B1 | 3/2018 |
| EP | 0649464 B1 | 7/1997 |
| EP | 0731845 B1 | 7/2003 |
| EP | 0941329 B1 | 7/2004 |
| EP | 0981637 B1 | 5/2005 |
| EP | 1220934 B1 | 12/2005 |
| EP | 0920498 B1 | 3/2006 |
| EP | 1583830 B1 | 9/2006 |
| EP | 1456386 B1 | 1/2009 |
| EP | 1642971 B1 | 7/2010 |
| EP | 1660654 B1 | 11/2011 |
| EP | 1727904 B1 | 3/2012 |
| EP | 1453966 B1 | 7/2012 |
| EP | 2121917 B1 | 2/2014 |
| EP | 2393927 B1 | 12/2014 |
| EP | 2692865 B1 | 12/2014 |
| EP | 2427557 B1 | 3/2015 |
| EP | 2558574 B1 | 3/2015 |
| EP | 2313497 B1 | 8/2015 |
| EP | 2361308 B1 | 10/2015 |
| EP | 1298207 B2 | 12/2015 |
| EP | 2227546 B1 | 5/2016 |
| EP | 2516653 B1 | 10/2016 |
| EP | 2640743 B1 | 10/2016 |
| EP | 2771470 B1 | 12/2016 |
| EP | 2864489 B1 | 3/2017 |
| EP | 1737971 B1 | 8/2017 |
| EP | 2563385 B1 | 8/2017 |
| EP | 3055409 B1 | 4/2018 |
| EP | 3027646 B1 | 6/2018 |
| EP | 2847338 B1 | 9/2018 |
| EP | 3156504 B1 | 10/2018 |
| EP | 3137602 B1 | 11/2018 |
| EP | 2898085 B1 | 1/2019 |
| EP | 2994531 B1 | 3/2019 |
| EP | 2802654 B1 | 4/2019 |
| EP | 2812435 B1 | 4/2019 |
| EP | 3083958 B1 | 4/2019 |
| EP | 3083677 B1 | 8/2019 |
| JP | 6214790 B2 | 10/2017 |
| KR | 10-2011-0068814 A | 6/2011 |
| KR | 10-2014-0106585 A | 9/2014 |
| WO | 00/31246 A2 | 6/2000 |
| WO | 02/101005 A2 | 12/2002 |
| WO | 03/031629 A1 | 4/2003 |
| WO | 2004/061104 A2 | 7/2004 |
| WO | 2005/019463 A1 | 3/2005 |
| WO | 2006/007850 A1 | 1/2006 |
| WO | 2008/145133 A2 | 12/2008 |
| WO | 2010/022737 A1 | 3/2010 |
| WO | 2010/118045 A1 | 10/2010 |
| WO | 2013/006142 A1 | 1/2013 |
| WO | 2013/092743 A2 | 6/2013 |
| WO | 2013/120929 A1 | 8/2013 |
| WO | 2014/033074 A1 | 3/2014 |
| WO | 2015/095804 A1 | 6/2015 |
| WO | 2016/020309 A1 | 2/2016 |
| WO | 2016/050917 A1 | 4/2016 |
| WO | 2016/079076 A1 | 5/2016 |
| WO | 2017/040335 A2 | 3/2017 |
| WO | 2017/055389 A1 | 4/2017 |
| WO | 2017/060144 A1 | 4/2017 |
| WO | 2017/161427 A1 | 9/2017 |
| WO | 2017/184831 A1 | 10/2017 |
| WO | 2018/002358 A1 | 1/2018 |
| WO | 2018/015428 A1 | 1/2018 |
| WO | 2018/035388 A1 | 2/2018 |
| WO | 2018/118901 A1 | 6/2018 |
| WO | 2018/148196 A1 | 8/2018 |
| WO | 2018/150269 A1 | 8/2018 |
| WO | 2018/150271 A1 | 8/2018 |
| WO | 2018/158141 A1 | 9/2018 |
| WO | 2018/158142 A1 | 9/2018 |
| WO | 2018/165204 A1 | 9/2018 |
| WO | 2018/167621 A1 | 9/2018 |
| WO | 2018/195555 A1 | 10/2018 |
| WO | 2018/197533 A1 | 11/2018 |
| WO | 2018/201071 A1 | 11/2018 |
| WO | 2018/210771 A1 | 11/2018 |
| WO | 2018/213266 A1 | 11/2018 |
| WO | 2018/217659 A1 | 11/2018 |
| WO | 2018/234223 A1 | 12/2018 |
| WO | 2019/010270 A1 | 1/2019 |
| WO | 2019/024150 A1 | 2/2019 |
| WO | 2019/028023 A2 | 2/2019 |
| WO | 2019/030373 A1 | 2/2019 |
| WO | 2019/051237 A1 | 3/2019 |
| WO | 2019/076489 A1 | 4/2019 |
| WO | 2019/086497 A2 | 5/2019 |
| WO | 2019/110691 A1 | 6/2019 |
| WO | 2019/126634 A2 | 6/2019 |
| WO | 2019/143677 A1 | 7/2019 |
| WO | 2019/143678 A1 | 7/2019 |
| WO | 201804763 B1 | 7/2019 |
| WO | 2019/161304 A1 | 8/2019 |
| WO | 2019/178613 A1 | 9/2019 |
| WO | 2109/173310 A1 | 9/2019 |
| WO | 20109/191552 A1 | 10/2019 |
| WO | 2020/132165 A1 | 6/2020 |
| WO | 2020/200983 A1 | 10/2020 |
| WO | 2020/254351 A1 | 12/2020 |
| WO | 2020/254352 A1 | 12/2020 |
| WO | 2020/254355 A1 | 12/2020 |
| WO | 2020/254356 A1 | 12/2020 |
| WO | 2020/254357 A1 | 12/2020 |
| ZA | 201100300 B1 | 1/2012 |

OTHER PUBLICATIONS

Magistrelli, G., et al., "Robust recombinant FcRn production in mammalian cells enabling oriented immobilization for IgG binding studies" J Immunol Methods 375(1-2):20-29 (Jan. 31, 2012).

Rajendra, Y., et al., "Transient and stable CHO expression, purification and characterization of novel hetero-dimeric bispecific IgG antibodies" Biotechnol Prog 33(2):469-477 (Mar. 1, 2017).

Brinkmann, U., et al., "The making of bispecific antibodies" MABS 9(2):182-212 (Jan. 10, 2017).

Hong, S., et al., "A phagemid system enabling easy estimation of the combinatorial antibody library size" Immunol Lett 91(2-3):247-253 (Feb. 15, 2004).

"International Preliminary Report on Patentability—PCT/EP2019/078972" (Report Issuance Date: Apr. 27, 2021, Chapter I), :pp. 1-7 (May 6, 2021).

"International Search Report—PCT/EP2019/078972" (w/Written Opinion), :pp. 1-14 (Dec. 6, 2019).

Kawabe, Y., et al., "Repeated integration of antibody genes into a pre-selected chromosomal locus of CHO cells using an accumula-

(56) References Cited

OTHER PUBLICATIONS tive site-specific gene integration system" Cytotechnology 64(3):267-279 (May 1, 2012).

Kitazawa, T., et al., "A bispecific antibody to factors IXa and X restores factor VIII hemostatic activity in a hemophilia A model" Nat Med 18(10):1570-1574 (Oct. 1, 2012).

Lanza, A., et al., "Using the Cre/lox system for targeted integration into the human genome: loxFAS-loxP pairing and delayed introduction of Cre DNA improve gene swapping efficiency" Biotechnol J 7(7):898-908 (Jul. 1, 2012).

Merchant, A., et al., "An efficient route to human bispecific IgG" Nat Biotechnol 16(7):677-681 (Jul. 1, 1998).

Regula, J., et al., "Variable heavy-variable light domain and Fab-arm CrossMabs with charged residue exchanges to enforce correct light chain assembly" Protein Eng Des Sel 31(7-8):289-299 (Jul. 1, 2018).

Sambrook, J., et al. Molecular Cloning: A Laboratory Manual Second edition, New York: Cold Spring Harbor Laboratory Press, (Jan. 1, 1989).

Sampei, Z., et al., "Identification and multidimensional optimization of an asymmetric bispecific IgG antibody mimicking the function of factor VIII cofactor activity" PLOS One 8(2):e57479 (1-13) (Feb. 28, 2013).

Schaefer, W., et al., "Immunoglobulin domain crossover as a generic approach for the production of bispecific IgG antibodies" PNAS USA 108(27):11187-11192 (Jul. 5, 2011).

Shima, M., et al., "Factor VIII-Mimetic Function of Humanized Bispecific Antibody in Hemophilia A" N Engl J Med 374(21):2044-2053 (May 26, 2016).

Turan, S., et al., "Recombinase-mediated cassette exchange (RMCE): traditional concepts and current challenges" J Mol Biol 407(2):193-221 (Mar. 25, 2011).

Wong, E., et al., "Reproducible doxycycline-inducible transgene expression at specific loci generated by Cre-recombinase mediated cassette exchange" Nucleic Acids Res 33(17):e147 (1-13) (Oct. 4, 2005).

Zhang, G et al., "Modification and identification of a vector for making a large phage antibody library" Chin Med J—Engl 120(22):2011-2016 (Nov. 20, 2007).

Zhang, H., et al., "Selection of antibodies that regulate phenotype from intracellular combinatorial antibody libraries" PNAS 109(39):15728-15733 (Sep. 10, 2012).

* cited by examiner

SEQUENCE LISTING

<160> NUMBER OF SEQ ID NOS: 4

<210> SEQ ID NO 1
<211> LENGTH: 20
<212> TYPE: DNA
<213> ORGANISM: Artificial Sequence
<220> FEATURE:
<223> OTHER INFORMATION: primer P_1

<400> SEQUENCE: 1
gcactagaag tcggcggtgt                                                  20

<210> SEQ ID NO 2
<211> LENGTH: 19
<212> TYPE: DNA
<213> ORGANISM: Artificial Sequence
<220> FEATURE:
<223> OTHER INFORMATION: primer P_2

```
-continued

<400> SEQUENCE: 2
gacagtggga gtggcacct                                              19

<210> SEQ ID NO 3
<211> LENGTH: 17
<212> TYPE: DNA
<213> ORGANISM: Artificial Sequence
<220> FEATURE:
<223> OTHER INFORMATION: primer P_3

<400> SEQUENCE: 3
ggcatgtgtg agttttg                                                17

<210> SEQ ID NO 4
<211> LENGTH: 20
<212> TYPE: DNA
<213> ORGANISM: Artificial Sequence
<220> FEATURE:
<223> OTHER INFORMATION: primer P_4

<400> SEQUENCE: 4
tgcttgagag agagtatgtg                                             20
```

MULTISPECIFIC ANTIBODY SCREENING METHOD USING RECOMBINASE MEDIATED CASSETTE EXCHANGE

CROSS-REFERENCE TO RELATED APPLICATIONS

This application is a continuation of International Application No. PCT/EP2019/078972 having an International filing date of Oct. 24, 2019 which claims priority to European Patent Application No. 18202732.6 filed on Oct. 26, 2018, both of which are incorporated herein in their entirety.

SEQUENCE LISTING

The instant application contains a Sequence Listing which has been submitted electronically in ASCII format and is hereby incorporated by reference in its entirety. Said ASCII copy, created on Apr. 6, 2021, is named P35109-US_Sequence_Listing.txt and is 1,084 bytes in size.

FIELD OF THE INVENTION

The current invention is in the field of cell line generation. More precisely, herein is reported a method for the generation of a library of bispecific antibody expressing cells by expression cassette randomization during targeted integration. These cells can be used as production cell lines.

BACKGROUND OF THE INVENTION

Antibodies or antibody like proteins can be engineered to bind to two different targets. The correct assembly of light and heavy chains can be promoted in many different ways (Brinkmann and Kontermann, 2017). One class of such proteins are IgG like bispecific antibodies with two different Fab fragments that are directed against two different targets, e.g. IgGs with one common light chain and two different heavy chains (Merchant et al., 1998) or CrossMabs, which comprise two different light chains as well as two different heavy chains ((Regula et al., 2018; Schaefer et al., 2011). Molecular engineering is used to promote the correct assembly of light and heavy chains.

Bispecific antibodies can be used to neutralize two soluble factors at the same time (Schaefer et al., 2011) Moreover, they have the potential to exert a complex mode of action such as the activation of a protein substrate by bringing the protein and its activator in close proximity and suitable orientation (Kitazawa et al., 2012; Shima et al., 2016). Finding the right combination of Fabs that are able to exert the desired function can be a significant effort (Sampei et al., 2013).

Secreted and glycosylated proteins such as antibodies are usually generated by recombinant expression in eukaryotic cells, either stable or transient. Using transient transfection, a multitude of separate transfections need to be performed to express a range of different bispecific antibodies, each transfection with clonal preparations of plasmids assuring that the supernatants contain only one sort of bispecific antibody and are suitable for screening. The same is true for stable transfection through random integration. In general, several plasmids integrate into the host genome if plasmids are transfected randomly. As a consequence, most transfected cells will secrete more than one type of bispecific antibody if they are transfected with a mixture of plasmids. This will happen even if all genes coding for one bispecific antibody are placed on the same plasmid. Lentiviral vectors have been used to partially overcome this limitation of random integration and to generate recombinant cell lines with only one or few single copy integrates. This has been used to generate and screen libraries of recombinant cell lines after simultaneous transduction with a lentiviral scFv-Fc fusion library (Zhang et al., 2012). However, Zhang et al. observed that many transfected cell line had been transfected with more than one lentivirus and consequently produced a mixture of recombinant product, which complicated the interpretation of screening results. Nevertheless, for Zhang et al. the random combination of scFv-Fc turned out to be advantageous as they unintendedly were able to identify potent bispecific agonistic binders. With antibody formats that in contrast to scFv-Fc fusion proteins consist of more than two polypeptides the potential of random combination of subunits and the complexity of the product mixtures are even higher rendering screening almost impossible.

Targeted integration by recombinase mediated cassette exchange (RMCE) is a method to direct foreign DNA specifically and efficiently to a pre-defined site in a eukaryotic host genome (Turan et al., 2011).

WO 2006/007850 discloses anti-rhesus D recombinant polyclonal antibody and methods of manufacture. To circumvent problems, the expression system used uses site-specific integration into the genome of the individual host cells. Said system encompasses a library of anti-RhD antibody expression vectors for site-specific integration comprising the variant nucleic acid segments encoding the anti-RhD rpAb. Individual nucleic acid segments from the library are inserted into individual cells at the same pre-established chromosomal location by site-specific integration at a predefined recombination recognition site or by a recombinase-mediated cassette exchange procedure, thereby generating a cell line, wherein the individual cells express a distinct member of the anti-RhD rpAb.

WO 2013/006142 discloses a novel process and reagent for rapid genetic alterations in eukaryotic cells. It is further disclosed a nearly homogenous population of genetically altered eukaryotic cells, having stably incorporated in its genome a donor cassette comprises a strong polyadenylation site operably linked to an isolated nucleic acid fragment comprising a targeting nucleic acid site and a selectable marker protein-coding sequence wherein the isolated nucleic acid fragment is flanked by a first recombination site and a second non-identical recombination site. It is reasoned in said document that substituting a promoter in front of the floxed Pur gene with a strong polyadenylation site should discourage unspecific integration events and generate puromycin-resistant colonies only in the case of correct recombination with the RMCE acceptor locus.

Kawabe, Y., et al. (Cytotechnol. 64 (2011) 267-279) disclosed repeated integration of antibody genes into a pre-selected chromosomal locus of CHO cells using an accumulative site-specific gene integration system. A method for preparing bispecific antibodies in E. coli cells is disclosed in KR 2011 0068814. WO 00/31246 disclosed methods for the preparation by in vivo recombination of nucleic acid and polypeptide libraries and uses thereof. Transposition-mediated identification of specific binding or functional proteins are disclosed in EP 2 692 865 B1.

SUMMARY OF THE INVENTION

One aspect of the current invention is an RMCE-base method for generating combinatorial expression libraries for bispecific antibodies in CHO cells in which each cell expresses exactly one type of bispecific molecule.

Another aspect of the invention is the vector library as such, especially its small size.

A further aspect of the invention are the vectors useful for generating the libraries themselves.

One aspect of the invention is a method for preparing a recombinant host cell library expressing a library of multi-specific antibodies comprising:

a) providing a targeted integration host cell comprising an exogenous nucleotide sequence integrated at a site within a locus of the genome of the host cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different;

b) introducing into the cell provided in a) a library of first vectors each comprising two recombination recognition sequences that are matching the first and the third recombination recognition sequence on the integrated exogenous nucleotide sequence, wherein the two recombination recognition sequences are flanking two or more exogenous nucleotide sequences and at least (a part of) one second selection marker, and a library of second vectors each comprising two recombination recognition sequences that are matching the second and the third recombination recognition sequence on the integrated exogenous nucleotide sequence, wherein the two recombination recognition sequences are flanking two or more (further) exogenous nucleotide sequences;

c) introducing i) either simultaneously with the libraries of first and second vectors of b); or ii) sequentially thereafter one or more recombinases, wherein the one or more recombinases recognize the recombination recognition sequences of the first and second vectors; (and optionally wherein the one or more recombinases perform two recombinase mediated cassette exchanges;) and d) selecting for recombinant host cells expressing the second selection marker and secreting a bispecific antibody, thereby preparing a recombinant host cell library expressing a library of bispecific antibodies.

In one embodiment the multispecific antibody is a bispecific antibody.

In one embodiment the two or more exogenous nucleotide sequences are independently of each other two to six, or two to four, or three, or four, or five, or six exogenous nucleotide sequences. In one embodiment the two or more exogenous nucleotide sequences are independently of each other two to three, or two to four. In one embodiment the two or more exogenous nucleotide sequences are two exogenous nucleotide sequences.

In one embodiment wherein the first vector and the second vector comprise in total four exogenous nucleotide sequences, wherein one of the four exogenous nucleotide sequences encodes the first light chain, one encodes the second light chain, one encodes the first heavy chain and one encodes the second heavy chain of the bispecific antibody.

In one embodiment each of the first and the second vector comprises one exogenous nucleotide sequence encoding an antibody light chain and one exogenous nucleotide sequence encoding an antibody heavy chain.

In one embodiment each of the first and the second vector comprises one exogenous nucleotide sequence encoding an antibody light chain and one exogenous nucleotide sequence encoding the cognate antibody heavy chain.

In one embodiment the first or the second vector comprises one exogenous nucleotide sequence encoding an antibody light chain and one exogenous nucleotide sequence encoding an antibody heavy chain, wherein the exogenous nucleotide sequence encoding the antibody light chain is located upstream (5') to the exogenous nucleotide sequence encoding the antibody heavy chain and the other vector comprises the exogenous nucleotide sequence encoding the antibody heavy chain located upstream (5') to the exogenous nucleotide sequence encoding the antibody light chain.

In one embodiment the first and the second vector each comprise one exogenous nucleotide sequence encoding an antibody light chain and one exogenous nucleotide sequence encoding an antibody heavy chain, wherein in each vector the exogenous nucleotide sequence encoding the antibody light chain is located upstream (5') to the exogenous nucleotide sequence encoding the antibody heavy chain.

In one embodiment the first and the second vector comprises one exogenous nucleotide sequence encoding an antibody light chain and one exogenous nucleotide sequence encoding an antibody heavy chain, wherein the exogenous nucleotide sequence encoding the antibody heavy chain located upstream (5') to the exogenous nucleotide sequence encoding the antibody light chain.

In one embodiment the first or the second vector comprises one exogenous nucleotide sequence encoding an antibody light chain and one exogenous nucleotide sequence encoding an antibody heavy chain, wherein the antibody light chain and the antibody heavy chain have a domain crossover.

In one embodiment the first vector comprises one exogenous nucleotide sequence encoding an antibody light chain and one exogenous nucleotide sequence encoding an antibody heavy chain, wherein the antibody light chain and the antibody heavy chain have a domain crossover.

In one preferred embodiment the first vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody light chain with domain crossover is located upstream (5') to the exogenous nucleotide sequence encoding the antibody heavy chain with domain crossover.

In one preferred embodiment the first vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody heavy chain with domain crossover is located upstream (5') to the exogenous nucleotide sequence encoding the antibody light chain with domain crossover.

In one embodiment the first vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody light chain with domain crossover is located upstream (5') to the exogenous nucleotide sequence encoding the antibody heavy chain with domain crossover; and the second vector comprises one exogenous nucleotide sequence encoding an antibody light chain and one exogenous nucleotide sequence encoding an antibody heavy chain, wherein the exogenous nucleotide sequence encoding the antibody light chain is located upstream (5') to the exogenous nucleotide sequence encoding the antibody heavy chain, or vice versa.

In one preferred embodiment the first vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody heavy chain with domain crossover is located upstream (5') to the exogenous nucleotide sequence encoding the antibody light chain with domain crossover; and the second vector comprises one exogenous nucleotide sequence encoding an antibody light chain and one exogenous nucleotide sequence encoding an antibody heavy chain, wherein the exogenous nucleotide sequence encoding the antibody light chain is located upstream (5') to the exogenous nucleotide sequence encoding the antibody heavy chain.

One aspect of the invention is a method for preparing a recombinant host cell expressing a bispecific antibody with domain crossover, comprising:
 a) providing a targeted integration host cell comprising an exogenous nucleotide sequence integrated at a site within a locus of the genome of the host cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different;
 b) introducing into the cell provided in a) a first vector each comprising two recombination recognition sequences matching the first and the third recombination recognition sequence on the integrated exogenous nucleotide sequence and flanking two exogenous nucleotide sequences and at least (a part of) one second selection marker coding sequence, and a second vector each comprising two recombination recognition sequences matching the second and the third recombination recognition sequence on the integrated exogenous nucleotide sequence and flanking at least two further exogenous nucleotide sequences; wherein the first vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody heavy chain with domain crossover is located upstream (5') to the exogenous nucleotide sequence encoding the antibody light chain with domain crossover; and the second vector comprises one exogenous nucleotide sequence encoding an antibody light chain and one exogenous nucleotide sequence encoding an antibody heavy chain, wherein the exogenous nucleotide sequence encoding the antibody light chain is located upstream (5') to the exogenous nucleotide sequence encoding the antibody heavy chain.
 c) introducing i) either simultaneously with the first and second vectors of b); or ii) sequentially thereafter one or more recombinases, wherein the one or more recombinases recognize the recombination recognition sequences of the first and second vectors; (and optionally wherein the one or more recombinases perform two recombinase mediated cassette exchanges;) and
 d) selecting for recombinant host cells expressing the second selection marker and secreting a bispecific antibody,
  thereby preparing a recombinant host cell expressing a bispecific antibody with domain crossover.

In one embodiment the first vector comprises a promoter sequence operably linked to the codon ATG, whereby the promoter sequence is flanked upstream by (i.e. positioned downstream to) the (two) exogenous nucleotide sequences and the ATG codon is flanked downstream by (i.e. positioned upstream to) a recombination recognition sequence; and the second vector comprises a selection marker lacking an ATG transcription start codon flanked upstream by a recombination recognition sequence and downstream by the (two) exogenous nucleotide sequences.

One aspect of the invention is a recombinant cell comprising an exogenous nucleotide sequence integrated at a site within a locus of the genome of the host cell,
wherein the exogenous nucleotide sequence comprises the following elements: a first, a second and a third recombination recognition sequence, a first and a second selectable marker, and a first to fourth expression cassette,
 wherein the 5'-to-3' sequences of said elements is
  RRS1-1st  EC-2nd  EC-RRS3-SM1-3rd  EC-4th EC-RRS2-SM2
 with
  RRS=recombination recognition sequence, EC=expression cassette, SM=selection marker.

In one embodiment each of the expression cassettes comprise in 5'-to-3' direction a promoter, a gene of interest and a polyA-site and optionally a terminator sequence.

In one embodiment
 i) the first expression cassette comprises in 5'-to-3' direction a promoter, a nucleic acid encoding an antibody heavy chain with domain crossover, and a polyA-site and optionally a terminator sequence;
 ii) the second expression cassette comprises in 5'-to-3' direction a promoter, a nucleic acid encoding an antibody light chain with domain crossover, and a polyA-site and optionally a terminator sequence,
 iii) the third expression cassette comprises in 5'-to-3' direction a promoter, a nucleic acid encoding an antibody light chain (without domain crossover), and a polyA-site and optionally a terminator sequence, and
 iv) the fourth expression cassette comprises in 5'-to-3' direction a promoter, a nucleic acid encoding an antibody heavy chain (without domain crossover), and a polyA-site and optionally a terminator sequence.

In one embodiment the promoter is the human CMV promoter with intron A, the polyA-site is the BGH polyA site and the terminator is the hGT terminator.

In one embodiment the domain crossover is a CH1-CL-crossover, or a VH-VL-crossover, or a VH/CH1-VL/CL-crossover.

In one embodiment i) the variable domains of the light chain with domain crossover and the heavy chain with domain crossover form a binding site specifically binding to a first antigen, and ii) the variable domains of the light chain without domain crossover and the heavy chain without domain crossover form a binding site specifically binding to a second antigen. In one embodiment the first antigen is a first epitope on an antigen and the second antigen is a second epitope on the antigen that is different from the first epitope. In one embodiment the first antigen and the second antigen are different antigens (polypeptides).

One aspect of the invention is a method of producing a bispecific antibody comprising:
a) providing a recombinant host cell according to the invention or prepared with a method according to the invention;
b) culturing the recombinant host cell in a) and recovering the bispecific antibody from the cell or the cultivation medium.

DETAILED DESCRIPTION OF EMBODIMENTS OF THE INVENTION

The invention is based, at least in part, on the finding that recombinase mediated cassette exchange (RMCE) can be used for generating combinatorial expression libraries for bispecific antibodies in CHO cells, in which each cell expresses exactly one type of bispecific molecule.

I. Definitions

The knobs into holes dimerization modules and their use in antibody engineering are described in Carter P.; Ridgway J. B. B.; Presta L. G.: Immunotechnology, Volume 2, Number 1, February 1996, pp. 73-73(1).

The CH3 domains in the heavy chains of an antibody can be altered by the "knob-into-holes" technology, which is described in detail with several examples in e.g. WO 96/027011, Ridgway, J. B., et al., Protein Eng. 9 (1996) 617-621; and Merchant, A. M., et al., Nat. Biotechnol. 16 (1998) 677-681. In this method the interaction surfaces of the two CH3 domains are altered to increase the heterodimerization of these two CH3 domains and thereby of the polypeptide comprising them. Each of the two CH3 domains (of the two heavy chains) can be the "knob", while the other is the "hole". The introduction of a disulfide bridge further stabilizes the heterodimers (Merchant, A. M., et al., Nature Biotech. 16 (1998) 677-681; Atwell, S., et al., J. Mol. Biol. 270 (1997) 26-35) and increases the yield.

The mutation T366W in the CH3 domain (of an antibody heavy chain) is denoted as "knob-mutation" or "mutation knob" and the mutations T366S, L368A, Y407V in the CH3 domain (of an antibody heavy chain) are denoted as "hole-mutations" or "mutations hole" (numbering according to Kabat EU index). An additional inter-chain disulfide bridge between the CH3 domains can also be used (Merchant, A. M., et al., Nature Biotech. 16 (1998) 677-681) e.g. by introducing a S354C mutation into the CH3 domain of the heavy chain with the "knob-mutation" (denotes as "knob-cys-mutations" or "mutations knob-cys") and by introducing a Y349C mutation into the CH3 domain of the heavy chain with the "hole-mutations" (denotes as "hole-cys-mutations" or "mutations hole-cys") (numbering according to Kabat EU index). But this is absent in the molecules of the current invention.

General information regarding the nucleotide sequences of human immunoglobulins light and heavy chains is given in: Kabat, E. A., et al., Sequences of Proteins of Immunological Interest, 5th ed., Public Health Service, National Institutes of Health, Bethesda, MD (1991).

As used herein, the amino acid positions of all constant regions and domains of the heavy and light chain are numbered according to the Kabat numbering system described in Kabat, et al., Sequences of Proteins of Immunological Interest, 5th ed., Public Health Service, National Institutes of Health, Bethesda, MD (1991) and is referred to as "numbering according to Kabat" herein. Specifically, the Kabat numbering system (see pages 647-660) of Kabat, et al., Sequences of Proteins of Immunological Interest, 5th ed., Public Health Service, National Institutes of Health, Bethesda, MD (1991) is used for the light chain constant domain CL of kappa and lambda isotype, and the Kabat EU index numbering system (see pages 661-723) is used for the constant heavy chain domains (CH1, Hinge, CH2 and CH3, which is herein further clarified by referring to "numbering according to Kabat EU index" in this case).

Useful methods and techniques for carrying out the current invention are described in e.g. Ausubel, F. M. (ed.), Current Protocols in Molecular Biology, Volumes I to III (1997); Glover, N. D., and Hames, B. D., ed., DNA Cloning: A Practical Approach, Volumes I and II (1985), Oxford University Press; Freshney, R.I. (ed.), Animal Cell Culture—a practical approach, IRL Press Limited (1986); Watson, J. D., et al., Recombinant DNA, Second Edition, CHSL Press (1992); Winnacker, E. L., From Genes to Clones; N.Y., VCH Publishers (1987); Celis, J., ed., Cell Biology, Second Edition, Academic Press (1998); Freshney, R.I., Culture of Animal Cells: A Manual of Basic Technique, second edition, Alan R. Liss, Inc., N.Y. (1987).

The use of recombinant DNA technology enables the generation of derivatives of a nucleic acid. Such derivatives can, for example, be modified in individual or several nucleotide positions by substitution, alteration, exchange, deletion or insertion. The modification or derivatization can, for example, be carried out by means of site directed mutagenesis. Such modifications can easily be carried out by a person skilled in the art (see e.g. Sambrook, J., et al., Molecular Cloning: A laboratory manual (1999) Cold Spring Harbor Laboratory Press, New York, USA; Hames, B. D., and Higgins, S. G., Nucleic acid hybridization—a practical approach (1985) IRL Press, Oxford, England).

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

The term "about" denotes a range of +/−20% of the thereafter following numerical value. In one embodiment the term about denotes a range of +/−10% of the thereafter following numerical value. In one embodiment the term about denotes a range of +/−5% of the thereafter following numerical value.

The term "comprising" also encompasses the term "consisting of".

The term "full length antibody" denotes an antibody having a structure substantially similar to a native antibody structure. A full length antibody comprises two full length antibody light chains each comprising a variable domain and a constant domain, and two full length antibody heavy chains each comprising a variable domain, a first constant domain, a hinge region, a second constant domain and a third constant domain. A full length antibody may comprise further domains, such as e.g. additional scFv or a scFab conjugated to one or more of the chains of the full length antibody. These conjugates are also encompassed by the term full length antibody.

The terms "eukaryotic cell", "host cell", "host cell line", and "host cell culture" are used interchangeably and refer to cells into which one or more exogenous nucleic acid(s) have been introduced, including the progeny of such cells. Host, cells include "transformants" and "transformed cells", which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

A "humanized" antibody refers to an antibody comprising amino acid residues from non-human HVRs and amino acid residues from human FRs. In certain embodiments, a humanized antibody will comprise substantially all of at least one, and typically two, variable domains, in which all or substantially all of the HVRs (e.g., the CDRs) correspond to those of a non-human antibody, and all or substantially all of the FRs correspond to those of a human antibody. A humanized antibody optionally may comprise at least a portion of an antibody constant region derived from a human antibody. A "humanized form" of an antibody, e.g., a non-human antibody, refers to an antibody that has undergone humanization.

The term "hypervariable region" or "HVR", as used herein, refers to each of the regions of an antibody variable domain comprising the amino acid residue stretches which are hypervariable in sequence ("complementarity determining regions" or "CDRs") and/or form structurally defined loops ("hypervariable loops"), and/or contain the antigen-contacting residues ("antigen contacts"). Generally, antibodies comprise six HVRs; three in the heavy chain variable domain VH (H1, H2, H3), and three in the light chain variable domain VL (L1, L2, L3).

HVRs include
 (a) hypervariable loops occurring at amino acid residues 26-32 (L1), 50-52 (L2), 91-96 (L3), 26-32 (H1), 53-55 (H2), and 96-101 (H3) (Chothia, C. and Lesk, A. M., J. Mol. Biol. 196 (1987) 901-917);
 (b) CDRs occurring at amino acid residues 24-34 (L1), 50-56 (L2), 89-97 (L3), 31-35b (H1), 50-65 (H2), and 95-102 (H3) (Kabat, E. A. et al., Sequences of Proteins of Immunological Interest, 5th ed. Public Health Service, National Institutes of Health, Bethesda, MD (1991), NIH Publication 91-3242.);
 (c) antigen contacts occurring at amino acid residues 27c-36 (L1), 46-55 (L2), 89-96 (L3), 30-35b (H1), 47-58 (H2), and 93-101 (H3) (MacCallum et al. J. Mol. Biol. 262: 732-745 (1996)); and
 (d) combinations of (a), (b), and/or (c), including amino acid residues 46-56 (L2), 47-56 (L2), 48-56 (L2), 49-56 (L2), 26-35 (H1), 26-35b (H1), 49-65 (H2), 93-102 (H3), and 94-102 (H3).

Unless otherwise indicated; HVR residues and other residues in the variable domain (e.g., FR residues) are numbered herein according to Kabat et al., supra.

An "isolated" composition is one which has been separated from a component of its natural environment. In some embodiments, a composition is purified to greater than 95% or 99% purity as determined by, for example, electrophoretic (e.g., SDS-PAGE, isoelectric focusing (IEF), capillary electrophoresis, CE-SDS) or chromatographic (e.g., size exclusion chromatography or ion exchange or reverse phase HPLC). For review of methods for assessment of e.g. antibody purity, see, e.g., Flatman, S. et al., J. Chrom. B 848 (2007) 79-87.

An "isolated" nucleic acid refers to a nucleic acid molecule that has been separated from a component of its natural environment. An isolated nucleic acid includes a nucleic acid molecule contained in cells that ordinarily contain the nucleic acid molecule, but the nucleic acid molecule is present extrachromosomally or at a chromosomal location that is different from its natural chromosomal location.

An "isolated" polypeptide or antibody refers to a polypeptide molecule or antibody molecule that has been separated from a component of its natural environment.

The term "monoclonal antibody" as used herein refers to an antibody obtained from a population of substantially-homogeneous antibodies, i.e., the individual antibodies comprising the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants. (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made by a variety of techniques, including but not limited to the hybridoma method, recombinant DNA methods, phage-display methods, and methods utilizing transgenic animals containing all or part of the human immunoglobulin loci, such methods and other exemplary methods for making monoclonal antibodies being described herein.

A "monospecific antibody" denotes an antibody that has a single binding specificity for one antigen. Monospecific antibodies can be prepared as full-length antibodies or antibody fragments (e.g. F(ab')$_2$) or combinations thereof (e.g. full length antibody plus additional scFv or Fab fragments). A monospecific antibody does not need to be monovalent, i.e. a monospecific antibody may comprise more than one binding site specifically binding to the one antigen. A native antibody, for example, is monospecific but bivalent.

A "multispecific antibody" denotes an antibody that has binding specificities for at least two different epitopes on the same antigen or two different antigens. Multispecific antibodies can be prepared as full-length antibodies or antibody fragments (e.g. F(ab')$_2$ bispecific antibodies) or combinations thereof (e.g. full length antibody plus additional scFv or Fab fragments). A multispecific antibody is at least bivalent, i.e. comprises two antigen binding sites. Also a multispecific antibody is at least bispecific. Thus, a bivalent, bispecific antibody is the simplest form of a multispecific antibody. Engineered antibodies with two, three or more (e.g. four) functional antigen binding sites have also been reported (see, e.g., US 2002/0004587 A1).

"Native antibodies" refer to naturally occurring immunoglobulin molecules with varying structures. For example, native IgG antibodies are heterotetrameric glycoproteins of about 150,000 daltons, composed of two identical light chains and two identical heavy chains that are disulfide-bonded. From N- to C-terminus, each heavy chain has a variable region (VH), also called a variable heavy chain domain or a heavy chain variable domain, followed by three constant domains (CH1, CH2, and CH3), whereby between the first and the second constant domain a hinge region is located. Similarly, from N- to C-terminus, each light chain has a variable region (VL), also called a variable light chain domain or a light chain variable domain, followed by a constant light chain domain (CL). The light chain of an antibody may be assigned to one of two types, called kappa (κ) and lambda (λ), based on the amino acid sequence of its constant domain.

The term "recombinant antibody", as used herein, denotes all antibodies (chimeric, humanized and human) that are prepared, expressed, created or isolated by recombinant means. This includes antibodies isolated from a host cell such as a NS0, HEK, BHK or CHO cell (i.e. expressed using a recombinant expression plasmid transfected into said host cell) or from an animal (e.g. a mouse) that is transgenic for human immunoglobulin genes or antibodies.

The term "valent" as used within the current application denotes the presence of a specified number of binding sites in a (antibody) molecule. As such, the terms "bivalent", "tetravalent", and "hexavalent" denote the presence of two binding site, four binding sites, and six binding sites, respectively, in a (antibody) molecule. The bispecific antibodies as reported herein as reported herein are in one preferred embodiment "bivalent".

The term "variable region" or "variable domain" refers to the domain of an antibody heavy or light chain that is involved in binding of the antigen by the antibody. The variable domains of the heavy chain and light chain (VH and VL, respectively) of a native antibody generally have similar structures, with each domain comprising four conserved framework regions (FRs) and three hypervariable regions (HVRs) (see, e.g., Kindt, T. J. et al. Kuby Immunology, 6th ed., W.H. Freeman and Co., N.Y. (2007), page 91). A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively (see, e.g., Portolano, S., et al., J. Immunol. 150 (1993) 880-887; Clackson, T., et al., Nature 352 (1991) 624-628).

The terms "vector" or "plasmid", which can be used interchangeably, as used herein, refer to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors".

The term "domain crossover" as used herein denotes that in a pair of an antibody heavy chain VH-CH1 fragment and its corresponding cognate antibody light chain, i.e. in an antibody Fab (fragment antigen binding), the domain sequence deviates from the sequence in a native antibody in that at least one heavy chain domain is substituted by its corresponding light chain domain and vice versa. There are three general types of domain crossovers, (i) the crossover of the CH1 and the CL domains, which leads by the domain crossover in the light chain to a VL-CH1 domain sequence and by the domain crossover in the heavy chain fragment to a VH-CL domain sequence (or a full length antibody heavy chain with a VH-CL-hinge-CH2-CH3 domain sequence), (ii) the domain crossover of the VH and the VL domains, which leads by the domain crossover in the light chain to a VH-CL domain sequence and by the domain crossover in the heavy chain fragment to a VL-CH1 domain sequence, and (iii) the domain crossover of the complete light chain (VL-CL) and the complete VH-CH1 heavy chain fragment ("Fab crossover"), which leads to by domain crossover to a light chain with a VH-CH1 domain sequence and by domain crossover to a heavy chain fragment with a VL-CL domain sequence (all aforementioned domain sequences are indicated in N-terminal to C-terminal direction).

As used herein the term "replaced by each other" with respect to corresponding heavy and light chain domains refers to the aforementioned domain crossovers. As such, when CH1 and CL domains are "replaced by each other" it is referred to the domain crossover mentioned under item (i) and the resulting heavy and light chain domain sequence. Accordingly, when VH and VL are "replaced by each other" it is referred to the domain crossover mentioned under item (ii); and when the CH1 and CL domains are "replaced by each other" and the VH and VL domains are "replaced by each other" it is referred to the domain crossover mentioned under item (iii). Bispecific antibodies including domain crossovers are reported, e.g. in WO 2009/080251, WO 2009/080252, WO 2009/080253, WO 2009/080254 and Schaefer, W., et al, Proc. Natl. Acad. Sci USA 108 (2011) 11187-11192. Such antibodies are generally termed CrossMab.

Multispecific antibodies produced by a cell obtained with a method according to the current invention also comprise in one embodiment at least one Fab fragment including either a domain crossover of the CH1 and the CL domains as mentioned under item (i) above, or a domain crossover of the VH and the VL domains as mentioned under item (ii) above, or a domain crossover of the VH-CH1 and the VL-VL domains as mentioned under item (iii) above. In case of multispecific antibodies with domain crossover, the Fabs specifically binding to the same antigen(s) are constructed to be of the same domain sequence. Hence, in case more than one Fab with a domain crossover is contained in the multispecific antibody, said Fab(s) specifically bind to the same antigen.

The term "binding to" denotes the binding of a binding site to its target, such as e.g. of an antibody binding site comprising an antibody heavy chain variable domain and an antibody light chain variable domain to the respective antigen. This binding can be determined using, for example, a BIAcore® assay (GE Healthcare, Uppsala, Sweden). That is, the term "binding (to an antigen)" denotes the binding of an antibody in an in vitro assay to its antigen(s). In one embodiment binding is determined in a binding assay in which the antibody is bound to a surface and binding of the antigen to the antibody is measured by Surface Plasmon Resonance (SPR). Binding means e.g. a binding affinity ($K_D$) of $10^{-8}$ M or less, in some embodiments of $10^{-13}$ to $10^{-8}$ M, in some embodiments of $10^{-3}$ to $10^{-9}$ M. The term "binding" also includes the term "specifically binding".

For example, in one possible embodiment of the BIAcore® assay the antigen is bound to a surface and binding of the antibody, i.e. its binding site(s), is measured by surface plasmon resonance (SPR). The affinity of the binding is defined by the terms $k_a$ (association constant: rate constant for the association to form a complex), $k_d$ (dissociation constant; rate constant for the dissociation of the complex), and $K_D$ ($k_d/k_a$). Alternatively, the binding signal of a SPR sensorgram can be compared directly to the response signal of a reference, with respect to the resonance signal height and the dissociation behaviors.

The term "binding site" denotes any proteinaceous entity that shows binding specificity to a target. This can be, e.g., a receptor, a receptor ligand, an anticalin, an affibody, an antibody, etc. Thus, the term "binding site" as used herein denotes a polypeptide that can specifically bind to or can be specifically bound by a second polypeptide. In one embodiment the binding site is selected from the group of polypeptides consisting of an antibody heavy chain variable domain, an antibody light chain variable domain, a pair of an antibody heavy chain and an antibody light chain variable domains, a receptor or functional fragment thereof, a receptor ligand or a functional fragment thereof, an enzyme or its substrate.

In case of an antibody the binding site comprises at least three HVRs (e.g. in case of a VHH) or three-six HVRs (e.g. in case of a naturally occurring, i.e. conventional, antibody with a VH/VL pair). Generally, the amino acid residues of an antibody that are responsible for antigen binding are forming the binding site. These residues are normally contained in a pair of an antibody heavy chain variable domain and a cognate antibody light chain variable domain. The antigen-binding site of an antibody comprises amino acid residues from the "hypervariable regions" or "HVRs". "Framework" or "FR" regions are those variable domain regions other than the hypervariable region residues as herein defined. Therefore, the light and heavy chain variable domains of an antibody comprise from N- to C-terminus the regions FR1, HVR1/CDR1, FR2, HVR2/CDR2, FR3, HVR3/CDR3, and FR4 (immunoglobulin framework). Especially, the HVR3/CDR3 region of the heavy chain variable domain is the region, which contributes most to antigen binding and defines the binding specificity of an antibody. A "functional binding site" is capable of specifically binding to its target. The term "specifically binding to" denotes the binding of a binding site to its target in an in vitro assay, in one embodiment in a binding assay. Such binding assay can be any assay as long the binding event can be detected. For example, an assay in which the antibody is bound to a surface and binding of the antigen(s) to the antibody is measured by Surface Plasmon Resonance (SPR). Alternatively, a bridging ELISA can be used.

The "class" of an antibody refers to the type of constant domain or constant region, preferably the Fc-region, possessed by its heavy chain. There are five major classes of antibodies: IgA, IgD, IgE, IgG, and IgM, and several of these may be further divided into subclasses (isotypes), e.g., IgG1, IgG2, IgG3, IgG4, IgA1, and IgA2. The heavy chain constant domains that correspond to the different classes of immunoglobulins are called α, δ, ε, γ, and μ, respectively.

The term "constant region" denotes the region of an immunoglobulin heavy chain that contains the constant domains, i.e. the CH1 domain, the hinge region, the CH2 domain and the CH3 domain. In one embodiment, a human IgG constant extends from Ala118 to the carboxyl-terminus of the heavy chain. However, the C-terminal lysine (Lys447) of the Fc-region may or may not be present. The Fc-region is composed of two heavy chain Fc-region polypeptides, which can be covalently linked to each other via the hinge region cysteine residues forming inter-chain disulfide bonds.

The term "Fc-region" denotes the C-terminal region of an immunoglobulin heavy chain that contains at least a part of the hinge region, the CH2 domain and the CH3 domain. In one embodiment, a human IgG heavy chain Fc-region extends from Asp221, or from Cys226, or from Pro230, to the carboxyl-terminus of the heavy chain. However, the C-terminal lysine (Lys447) of the Fc-region may or may not be present. The Fc-region is composed of two heavy chain Fc-region polypeptides, which can be covalently linked to each other via the hinge region cysteine residues forming inter-chain disulfide bonds.

The antibodies as produced in the method as reported herein comprise as Fc-region, in one embodiment an Fc-region derived from human origin. In one embodiment the Fc-region comprises all parts of the human constant region. The Fc-region of an antibody is directly involved in complement activation, C1q binding, C3 activation and Fc receptor binding. While the influence of an antibody on the complement system is dependent on certain conditions, binding to C1q is caused by defined binding sites in the Fc-region. Such binding sites are known in the state of the art and described e.g. by Lukas, T. J., et al., J. Immunol. 127 (1981) 2555-2560; Brunhouse, R., and Cebra, J. J., Mol. Immunol. 16 (1979) 907-917; Burton, D. R., et al., Nature 288 (1980) 338-344; Thommesen, J. E., et al., Mol. Immunol. 37 (2000) 995-1004; Idusogie, E. E., et al., J. Immunol. 164 (2000) 4178-4184; Hezareh, M., et al., J. Virol. 75 (2001) 12161-12168; Morgan, A., et al., Immunology 86 (1995) 319-324; and EP 0 307 434. Such binding sites are e.g. L234, L235, D270, N297, E318, K320, K322, P331 and P329 (numbering according to EU index of Kabat). Antibodies of subclass IgG1, IgG2 and IgG3 usually show complement activation, C1q binding and C3 activation, whereas IgG4 do not activate the complement system, do not bind C1q and do not activate C3. An "Fc-region of an antibody" is a term well known to the skilled artisan and defined on the basis of papain cleavage of antibodies. In one embodiment the Fc-region is a human Fc-region. In one embodiment the Fc-region is of the human IgG4 subclass comprising the mutations S228P and/or L235E (numbering according to EU index of Kabat). In one embodiment the Fc-region is of the human IgG1 subclass comprising the mutations L234A and L235A and optionally P329G (numbering according to EU index of Kabat).

As used herein, the term "selection marker" denotes a gene that allows cells carrying the gene to be specifically selected for or against, in the presence of a corresponding selection agent. For example, but not by way of limitation, a selection marker can allow the host cell transformed with the selection marker gene to be positively selected for in the presence of the respective selection agent (selective cultivation conditions); a non-transformed host cell would not be capable of growing or surviving under the selective cultivation conditions. Selection markers can be positive, negative or bi-functional. Positive selection markers can allow selection for cells carrying the marker, whereas negative selection markers can allow cells carrying the marker to be selectively eliminated. A selection marker can confer resistance to a drug or compensate for a metabolic or catabolic defect in the host cell. In prokaryotic cells, amongst others, genes conferring resistance against ampicillin, tetracycline, kanamycin or chloramphenicol can be used. Resistance genes useful as selection markers in eukaryotic cells include, but are not limited to, genes for aminoglycoside phosphotransferase (APH) (e.g., hygromycin phosphotransferase (HYG), neomycin and G418 APH), dihydrofolate reductase (DHFR), thymidine kinase (TK), glutamine synthetase (GS), asparagine synthetase, tryptophan synthetase (indole), histidinol dehydrogenase (histidinol D), and genes encoding resistance to puromycin, blasticidin, bleomycin, phleomycin, chloramphenicol, Zeocin, and mycophenolic acid. Further marker genes are described in WO 92/08796 and WO 94/28143.

Beyond facilitating a selection in the presence of a corresponding selection agent, a selection marker can alternatively provide a gene encoding a molecule normally not present in the cell, e.g., green fluorescent protein (GFP), enhanced GFP (eGFP), synthetic GFP, yellow fluorescent protein (YFP), enhanced YFP (eYFP), cyan fluorescent protein (CFP), mPlum, mCherry, tdTomato, mStrawberry, J-red, DsRed-monomer, mOrange, mKO, mCitrine, Venus, YPet, Emerald, CyPet, mCFPm, Cerulean, and T-Sapphire. Cells harboring such a gene can be distinguished from cells not harboring this gene, e.g., by the detection of the fluorescence emitted by the encoded polypeptide.

As used herein, the term "operably linked" refers to a juxtaposition of two or more components, wherein the components are in a relationship permitting them to function in their intended manner. For example, a promoter and/or an enhancer is operably linked to a coding sequence if the promoter and/or enhancer acts to modulate the transcription of the coding sequence. In certain embodiments, DNA sequences that are "operably linked" are contiguous and adjacent on a single chromosome. In certain embodiments, e.g., when it is necessary to join two protein encoding regions, such as a secretory leader and a polypeptide, the sequences are contiguous, adjacent, and in the same reading frame. In certain embodiments, an operably linked promoter is located upstream of the coding sequence and can be adjacent to it. In certain embodiments, e.g., with respect to enhancer sequences modulating the expression of a coding sequence, the two components can be operably linked although not adjacent. An enhancer is operably linked to a coding sequence if the enhancer increases transcription of the coding sequence. Operably linked enhancers can be located upstream, within, or downstream of coding sequences and can be located at a considerable distance from the promoter of the coding sequence. Operable linkage can be accomplished by recombinant methods known in the art, e.g., using PCR methodology and/or by ligation at convenient restriction sites. If convenient restriction sites do not exist, then synthetic oligonucleotide adaptors or linkers can be used in accord with conventional practice. An internal ribosomal entry site (IRES) is operably linked to an open reading frame (ORF) if it allows initiation of translation of the ORF at an internal location in a 5' end-independent manner.

The term "antibody" herein is used in the broadest sense and encompasses various antibody structures, including but not limited to monoclonal antibodies, multispecific antibodies (e.g., bispecific antibodies), and antibody-antibody fragment-fusion.

As used herein, the term "antibody fragment" refers to a molecule other than an intact antibody that comprises a portion of an intact antibody that binds the antigen to which the intact antibody binds, i.e. it is a functional fragment. Examples of antibody fragments include but are not limited to Fv; Fab; Fab'; Fab'-SH; F(ab')2; bispecific Fab; diabodies; linear antibodies; single-chain antibody molecules (e.g., scFv or scFab).

As used herein, the term "homologous sequences" refers to sequences that share a significant sequence similarity as determined by an alignment of the sequences. For example, two sequences can be about 50%, 60%, 70%, 80%, 90%, 95%, 99%, or 99.9% homologous. The alignment is carried out by algorithms and computer programs including, but not limited to, BLAST, FASTA, and HMME, which compares sequences and calculates the statistical significance of matches based on factors such as sequence length, sequence identify and similarity, and the presence and length of sequence mismatches and gaps. Homologous sequences can refer to both DNA and protein sequences. Homology does not need to be existing for an entire nucleic acid sequence or protein but can also be only for a fraction thereof, if this is indicated in the context.

As used herein, the term "flanking" refers to that a first nucleotide sequence is located at either a 5' or 3' end, or both ends of a second nucleotide sequence. The flanking nucleotide sequence can be adjacent to or at a defined distance from the second nucleotide sequence. There is no specific limit of the length of a flanking nucleotide sequence. For example, a flanking sequence can be a few base pairs or a few thousand base pairs.

As used herein, the term "exogenous" indicates that a nucleotide sequence does not originate from a host cell and is introduced into a host cell by traditional DNA delivery methods, e.g., by transfection, electroporation, or transformation methods. The term "endogenous" refers to that a nucleotide sequence originates from a host cell. An "exogenous" nucleotide sequence can have an "endogenous" counterpart that is identical in base compositions, but where the "exogenous" sequence is introduced into the host cell, e.g., via recombinant DNA technology.

II. Compositions and Methods

Conventional cell line development (CLD) relies on the random integration (RI) of the plasmid carrying the sequence of interest (SOI).

Antibodies are usually produced by recombinant expression in eukaryotic cells, either stable or transient. Using transient transfection, a multitude of separate transfections need to be performed to express a multitude of different bispecific antibodies. Each such transfection includes clonal preparations of plasmids assuring that the supernatants contain only one sort of bispecific antibody in order to ensure suitability for the following screening step. The same is true if a stable transfection approach is followed due the random integration of the encoding nucleic acid(s).

In general, several plasmids integrate into the host cell genome if plasmids are transfected by a random approach. As a consequence, most transfected cells will secrete more than one type of bispecific antibody if they are transfected with a mixture of plasmids. This will happen even if all genes coding for one bispecific antibody are placed on the same plasmid due to multiple copy integration.

Thus, with antibody formats that comprise more than two polypeptides the potential of random combination of subunits and the complexity of the product mixtures is high rendering screening almost impossible. This is true even with engineered antibody formats such as CrossMab (see FIG. 1).

Thus, processes based on RI are non-predictable, and in addition labor intensive. As such, a large effort is required to identify the high producing RI clones.

Unlike the conventional RI CLD, targeted integration (TI) CLD introduces the transgene at a predetermined "hot-spot" in the CHO genome with a defined copy number (usually 1-2 copies). Given the low copy number and the pretested integration site, TI cell lines should have better stability compared to the RI lines. Moreover, since the selective marker is only used for selecting cells with proper TI and not for selecting cells with a high level of transgene expression, a less mutagenic marker may be applied to minimize the chance of sequence variants (SVs), which is in part due to the mutagenicity of the selective agents like methotrexate (MTX) or methionine sulfoximine (MSX).

The current invention uses TI methodology to screen and identify recombinant cell lines expressing a single bispecific antibody, i.e. comprising only one expression cassette of each of the first light chain, the second light chain, the first heavy chain and the second heavy chain.

The current invention provides a novel method of generating libraries of bispecific antibody expressing recombinant cells using two-plasmid recombinase mediated cassette exchange (RMCE). The improvement lies, amongst other things, in the reduced time required to generate the libraries compared to RI methods as well as in the fact that the cells of the library comprise exactly a single copy of the different sequences encoding a bispecific antibody in a single TI locus. The method according to the current invention is especially useful for bispecific antibodies comprising domain exchanges between one of their light chains and the corresponding heavy chain. The current inventive method is also especially useful in that different sequences of different expression cassettes can be generated in one transfection using pools of different integrating plasmids. Thereby a library of cells is provided with different, random expression cassette combinations, but only one for each chain. Thereafter the cells of the library can be screened for best product yield and quality.

The presently disclosed subject matter not only provides methods for screening recombinant cell lines that express recombinant bispecific antibody but also recombinant cell lines that have high productivity of bispecific antibodies with advantageous by-product profiles.

The advantages of the two-plasmid RMCE method include increased productivity and the flexibility to co-express different combinations of multiple polypeptides from the same TI locus.

The two-plasmid RMCE strategy used herein allows for the combinatorial insertion of four sequences (i.e. of two different antibody heavy chains (HCs) and two different antibody light chains (LCs)) in the same TI locus. With the two-plasmid RMCE method as used herein it is possible to combine different half-antibodies during cassette exchange and thereby to provide libraries of bispecific antibodies wherein the diversity is based on the combination of different half-antibodies. Thus, with the ability to target four sequences simultaneously, the two-plasmid RMCE enables modulation of HC/LC-pair combinations to provide libraries of cells expressing different bispecific antibodies. Concomitantly, the productivity of the expression of complex molecules with multiple chains is improved.

II.a Recombinase Mediated Cassette Exchange

A targeted integration allows for exogenous nucleotide sequences to be integrated into a pre-determined site of a host cell genome. In certain embodiments, the targeted integration is mediated by a recombinase that recognizes one or more recombination recognition sequences (RRSs). In certain embodiments, the targeted integration is mediated by homologous recombination.

A "recombination recognition sequence" (RRS) is a nucleotide sequence recognized by a recombinase and is necessary and sufficient for recombinase-mediated recombination events. A RRS can be used to define the position where a recombination event will occur in a nucleotide sequence.

In certain embodiments, a RRS is selected from the group consisting of a LoxP sequence, a LoxP L3 sequence, a LoxP 2L sequence, a LoxFas sequence, a Lox511 sequence, a Lox2272 sequence, a Lox2372 sequence, a Lox5171 sequence, a Loxm2 sequence, a Lox71 sequence, a Lox66 sequence, a FRT sequence, a Bxb1 attP sequence, a Bxb1 attB sequence, a αC31 attP sequence, and a αC31 attB sequence. If multiple RRSs have to be selected the selection of each of the sequences is dependent on the other insofar as non-identical RRSs are chosen.

In certain embodiments, a RRS can be recognized by a Cre recombinase. In certain embodiments, a RRS can be recognized by a FLP recombinase. In certain embodiments, a RRS can be recognized by a Bxb1 integrase. In certain embodiments, a RRS can be recognized by a αC31 integrase.

In certain embodiments when the RRS is a LoxP site, the host cell requires the Cre recombinase to perform the recombination. In certain embodiments when the RRS is a FRT site, the host cell requires the FLP recombinase to perform the recombination. In certain embodiments when the RRS is a Bxb1 attP or a Bxb1 attB site, the host cell requires the Bxb1 integrase to perform the recombination. In certain embodiments when the RRS is a αC31 attP or a αC31attB site, the host cell requires the αC31 integrase to perform the recombination. The recombinases can be introduced into a host cell using an expression vector comprising coding sequences of the enzymes.

The Cre-LoxP site-specific recombination system has been widely used in many biological experimental systems. Cre is a 38-kDa site-specific DNA recombinase that recognizes 34 bp LoxP sequences. Cre is derived from bacteriophage P1 and belongs to the tyrosine family site-specific recombinase. Cre recombinase can mediate both intra and intermolecular recombination between LoxP sequences. The LoxP sequence is composed of an 8 bp non-palindromic core region flanked by two 13 bp inverted repeats. Cre recombinase binds to the 13 bp repeat thereby mediating recombination within the 8 bp core region. Cre-LoxP-mediated recombination occurs at a high efficiency and does not require any other host factors. If two LoxP sequences are placed in the same orientation on the same nucleotide sequence, Cre-mediated recombination will excise DNA sequences located between the two LoxP sequences as a covalently closed circle. If two LoxP sequences are placed in an inverted position on the same nucleotide sequence, Cre-mediated recombination will invert the orientation of the DNA sequences located between the two sequences. LoxP sequences can also be placed on different chromosomes to facilitate recombination between different chromosomes. If two LoxP sequences are on two different DNA molecules and if one DNA molecule is circular, Cre-mediated recombination will result in integration of the circular DNA sequence.

In certain embodiments, a LoxP sequence is a wild-type LoxP sequence. In certain embodiments, a LoxP sequence is a mutant LoxP sequence. Mutant LoxP sequences have been developed to increase the efficiency of Cre-mediated integration or replacement. In certain embodiments, a mutant LoxP sequence is selected from the group consisting of a LoxP L3 sequence, a LoxP 2L sequence, a LoxFas sequence, a Lox511 sequence, a Lox2272 sequence, a Lox2372 sequence, a Lox5171 sequence, a Loxm2 sequence, a Lox71 sequence, and a Lox66 sequence. For example, the Lox71 sequence has 5 bp mutated in the left 13 bp repeat. The Lox66 sequence has 5 bp mutated in the right 13 bp repeat. Both the wild-type and the mutant LoxP sequences can mediate Cre-dependent recombination.

The term "matching RRSs" indicates that a recombination occurs between two RRSs. In certain embodiments, the two matching RRSs are the same. In certain embodiments, both RRSs are wild-type LoxP sequences. In certain embodiments, both RRSs are mutant LoxP sequences. In certain embodiments, both RRSs are wild-type FRT sequences. In certain embodiments, both RRSs are mutant FRT sequences. In certain embodiments, the two matching RRSs are different sequences but can be recognized by the same recombinase. In certain embodiments, the first matching RRS is a Bxb1 attP sequence and the second matching RRS is a Bxb1 attB sequence. In certain embodiments, the first matching RRS is a φC31 attB sequence and the second matching RRS is a φC31 attB sequence.

II.b Exemplary Targeted Integration Host Cell Lines

A suitable TI host cell comprises an exogenous nucleotide sequence, i.e. a "landing site", integrated at a specific site within a locus of the genome of the host cell.

The presently disclosed subject matter provides a host cell suitable for targeted integration of exogenous nucleotide sequences. In certain embodiments, the host cell comprises an exogenous nucleotide sequence integrated at an integration site on the genome of the host cell, i.e., a TI host cell.

In certain embodiments, a TI host cell is a mammalian host cell. In certain embodiments, a TI host cell is a hamster host cell, a human host cell, a rat host cell, or a mouse host cell. In certain embodiments, a TI host cell is a Chinese hamster ovary (CHO) host cell, a CHO K1 host cell, a CHO K1SV host cell, a DG44 host cell, a DUKXB-11 host cell, a CHOK1S host cell, or a CHO KIM host cell.

In certain embodiments, a TI host cell comprises an integrated exogenous nucleotide sequence, wherein the exogenous nucleotide sequence comprises one or more recombination recognition sequence (RRS). In certain embodiments, the exogenous nucleotide sequence comprises at least two RRSs. The RRS can be recognized by a recombinase, for example, a Cre recombinase, an FLP recombinase, a Bxb1 integrase, or a φC31 integrase. The RRS can be selected from the group consisting of a LoxP sequence, a LoxP L3 sequence, a LoxP 2L sequence, a LoxFas sequence, a Lox511 sequence, a Lox2272 sequence, a Lox2372 sequence, a Lox5171 sequence, a Loxm2 sequence, a Lox71 sequence, a Lox66 sequence, a FRT sequence, a Bxb1 attP sequence, a Bxb1 attB sequence, a φC31 attP sequence, and a φC31 attB sequence.

In certain embodiments, the exogenous nucleotide sequence comprises a first, a second and a third RRS, and at least one selection marker located between the first and the second RRS, and the third RRS is different from the first or the second RRS. In certain embodiments, the exogenous nucleotide sequence further comprises a second selection marker, and the first and the second selection markers are different. In certain embodiments, the exogenous nucleotide sequence can further comprise a third selection marker and an internal ribosome entry site (IRES), wherein the IRES is operably linked to the third selection marker. The third selection marker can be different from the first or the second selection marker.

The selection markers can be selected from the group consisting of an aminoglycoside phosphotransferase (APH) (e.g., hygromycin phosphotransferase (HYG), neomycin and G418 APH), dihydrofolate reductase (DHFR), thymidine kinase (TK), glutamine synthetase (GS), asparagine synthetase, tryptophan synthetase (indole), histidinol dehydrogenase (histidinol D), and genes encoding resistance to puromycin, blasticidin, bleomycin, phleomycin, chloramphenicol, Zeocin, and mycophenolic acid. The selection markers can also be selected from the group consisting of a green fluorescent protein (GFP) marker, an enhanced GFP (eGFP) marker, a synthetic GFP marker, a yellow fluorescent protein (YFP) marker, an enhanced YFP (eYFP) marker, a cyan fluorescent protein (CFP) marker, an mPlum marker, an mCherry marker, a tdTomato marker, an mStrawberry marker, a J-red marker, a DsRed-monomer marker, an mOrange marker, an mKO marker, an mCitrine marker, an Venus marker, a YPet marker, an Emerald6 marker, a CyPet marker, an mCFPm marker, a Cerulean marker, and a T-Sapphire marker.

In certain embodiments, the exogenous nucleotide sequence comprises a first, second, and third RRS, at least one selection marker located between the first and the third RRS.

An "integration site" comprises a nucleic acid sequence within a host cell genome into which an exogenous nucleotide sequence is inserted. In certain embodiments, an integration site is between two adjacent nucleotides on the host cell genome. In certain embodiments, an integration site includes a stretch of nucleotide sequences. In certain embodiments, the integration site is located within a specific locus of the genome of the TI host cell. In certain embodiments, the integration site is within an endogenous gene of the TI host cell.

An exogenous nucleotide sequence is a nucleotide sequence that does not originate from a host cell but can be introduced into a host cell by traditional DNA delivery methods, e.g., by transfection, electroporation, or transformation methods. In certain embodiments, a TI host cell comprises at least one exogenous nucleotide sequence integrated at one or more integration sites in the genome of the TI host cell. In certain embodiments, the exogenous nucleotide sequence is integrated at one or more integration sites within a specific a locus of the genome of the TI host cell.

In certain embodiments, an integrated exogenous nucleotide sequence comprises one or more recombination recognition sequence (RRS), wherein the RRS can be recognized by a recombinase. In certain embodiments, the integrated exogenous nucleotide sequence comprises at least two RRSs. In certain embodiments, an integrated exogenous nucleotide sequence comprises three RRSs, wherein the third RRS is located between the first and the second RRS. In certain embodiments, the first and the second RRS are the same and the third RRS is different from the first or the second RRS. In certain embodiments, all three RRSs are different. In certain embodiments, an integrated exogenous nucleotide sequence comprises four, five, six, seven, or eight RRSs. In certain embodiments, an integrated exogenous nucleotide sequence comprises multiple RRSs. In certain embodiments, a subset of the total number of RRSs are the same and a subset of the total number of RRSs are different. In certain embodiments, the RRS or RRSs can be selected from the group consisting of a LoxP sequence, a LoxP L3 sequence, a LoxP 2L sequence, a LoxFas sequence, a Lox511 sequence, a Lox2272 sequence, a Lox2372 sequence, a Lox5171 sequence, a Loxm2 sequence, a. Lox71 sequence, a Lox66 sequence, a FRT sequence, a Bxb1 attP sequence, a Bxb1 attB sequence, a 0C31 attP sequence, and a φC31 attB sequence.

In certain embodiments, the integrated exogenous nucleotide sequence comprises at least one selection marker. In certain embodiments, the integrated exogenous nucleotide sequence comprises a first, a second and a third RRS, and at least one selection marker. In certain embodiments, a selection marker is located between the first and the second RRS. In certain embodiments, two RRSs flank at least one selection marker, i.e., a first RRS is located 5' upstream and a second RRS is located 3' downstream of the selection marker. In certain embodiments, a first RRS is adjacent to the 5' end of the selection marker and a second RRS is adjacent to the 3' end of the selection marker.

In certain embodiments, a selection marker is located between a first and a second RRS and the two flanking RRSs are different. In certain embodiments, the first flanking RRS is a LoxP L3 sequence and the second flanking RRS is a LoxP 2L sequence. In certain embodiments, a LoxP L3 sequenced is located 5' of the selection marker and a LoxP 2L sequence is located 3' of the selection marker. In certain embodiments, the first flanking RRS is a wild-type FRT sequence and the second flanking RRS is a mutant FRT sequence. In certain embodiments, the first flanking RRS is a Bxb1 attP sequence and the second flanking RRS is a Bxb1 attB sequence. In certain embodiments, the first flanking RRS is a φC31 attP sequence and the second flanking RRS is a φC31 attB sequence. In certain embodiments, the two RRSs are positioned in the same orientation. In certain embodiments, the two RRSs are both in the forward or reverse orientation. In certain embodiments, the two RRSs are positioned in opposite orientation.

In certain embodiments, the integrated exogenous nucleotide sequence comprises two selection markers flanked by two RRSs, wherein a first selection marker is different from a second selection marker. In certain embodiments, the two selection markers are both selected from the group consisting of a glutamine synthetase selection marker, a thymidine kinase selection marker, a HYG selection marker, and a puromycin resistance selection marker. In certain embodiments, the integrated exogenous nucleotide sequence comprises a thymidine kinase selection marker and a HYG selection marker. In certain embodiments, the first selection maker is selected from the group consisting of an aminoglycoside phosphotransferase (APH) (e.g., hygromycin phosphotransferase (HYG), neomycin and G418 APH), dihydrofolate reductase (DHFR), thymidine kinase (TK), glutamine synthetase (GS), asparagine synthetase, tryptophan synthetase (indole), histidinol dehydrogenase (histidinol D), and genes encoding resistance to puromycin, blasticidin, bleomycin, phleomycin, chloramphenicol, Zeocin, and mycophenolic acid, and the second selection maker is selected from the group consisting of a GFP, an eGFP, a synthetic GFP, a YFP, an eYFP, a CFP, an mPlum, an mCherry, a tdTomato, an mStrawberry, a J-red, a DsRed-monomer, an mOrange, an mKO, an mCitrine, a Venus, a YPet, an Emerald, a CyPet, an mCFPm, a Cerulean, and a T-Sapphire marker. In certain embodiments, the first selection marker is a glutamine synthetase selection marker and the second selection marker is a GFP marker. In certain embodiments, the two RRSs flanking both selection markers are different.

In certain embodiments, the selection marker is operably linked to a promoter sequence. In certain embodiments, the selection marker is operably linked to an SV40 promoter. In certain embodiments, the selection marker is operably linked to a Cytomegalovirus (CMV) promoter.

In certain embodiments, the integrated exogenous nucleotide sequence comprises three RRSs. In certain embodiments, the third RRS is located between the first and the second RRS. In certain embodiments, the first and the second RRS are the same, and the third RRS is different from the first or the second RRS. In certain embodiments, all three RRSs are different.

II.c Exemplary Vectors Suitable for Performing the Invention

Beside the "single-vector RMCE" as outlined above a novel "two-vector RMCE" can be performed for simultaneous targeted integration and randomization.

A "two-vector RMCE" strategy is employed in the method according to the current invention. For example, but not by way of limitation, an integrated exogenous nucleotide sequence could comprise three RRSs, e.g., an arrangement where the third RRS ("RRS3") is present between the first RRS ("RRS1") and the second RRS ("RRS2"), while a first vector comprises two RRSs matching the first and the third RRS on the integrated exogenous nucleotide sequence, and a second vector comprises two RRSs matching the third and the second RRS on the integrated exogenous nucleotide sequence. An example of a two vector RMCE strategy is illustrated in FIG. 2. Such two vector RMCE strategies allow for the introduction of four SOIs by incorporating the appropriate number of SOIs between each pair of RRSs.

The two-plasmid RMCE strategy involves using three RRS sites to carry out two independent RMCEs simultaneously (FIG. 2). Therefore, a landing pad in the TI host includes a third RRS site (RRS3) that has no cross activity with either the RRS1 or RRS2 sites. The two expression plasmids to be targeted require the same flanking RRS sites for efficient targeting, one expression plasmid (front) flanked by RRS1 and RRS3 and the other (back) by RRS3 and RRS2. Since the two-plasmid RMCE efficiency is expected to be low, a stringent selection scheme would be required to enrich the rare RMCE specific events. Two selection markers are needed in the two-plasmid RMCE. One selection marker expression cassette was split into two parts. The front plasmid would contain the promoter followed by a start codon and the RRS3 sequence. The back plasmid would have the RRS3 sequence fused to the N-terminus of the selection marker coding region, minus the ATG start. Additional nucleotides may need to be inserted between the RRS3 site and the selection marker sequence to ensure in frame translation for the fusion protein. Only when the two plasmids are correctly targeted would the full expression cassette of the selection marker be assembled thus rendering cells resistance to selection. FIG. 2 is the schematic diagram showing the two plasmid RMCE strategy.

Both single-vector and two-vector RMCE allow for unidirectional integration of one or more donor DNA molecule(s) into a pre-determined site of a host cell genome, and precise exchange of a DNA cassette present on the donor DNA with a DNA cassette on the host genome where the integration site resides. The DNA cassettes are characterized by two heterospecific RRSs flanking at least one selection marker (although in certain two-vector RMCE examples a "split selection marker" can be used as outlined herein) and/or at least one exogenous SOI. RMCE involves double recombination cross-over events, catalyzed by a recombinase, between the two heterospecific RRSs within the target genomic locus and the donor DNA molecule. RMCE is designed to introduce a copy of the SOI or selection marker into the pre-determined locus of a host cell genome. Unlike recombination which involves just one cross-over event, RMCE can be implemented such that prokaryotic vector sequences are not introduced into the host cell genome, thus reducing and/or preventing unwanted triggering of host immune or defense mechanisms. The RMCE procedure can be repeated with multiple DNA cassettes.

In certain embodiments, targeted integration is achieved by two RMCEs, wherein two different DNA cassettes, each comprising at least an exogenous SOI or at least one selection marker flanked by two heterospecific RRSs, are both integrated into a pre-determined site of a host cell genome. In certain embodiments, targeted integration is achieved by multiple RMCEs, wherein DNA cassettes from multiple vectors, each comprising at least an exogenous SOI or at least one selection marker flanked by two heterospecific RRSs, are all integrated into a predetermined site of a host cell genome. In certain embodiments the selection marker can be partially encoded on the first the vector and partially encoded on the second vector such that the integration of both RMCEs allows for the expression of the selection marker. An example of such a system is presented in FIG. 2.

In certain embodiments, targeted integration via recombinase-mediated recombination leads to selection marker or one or more exogenous SOI integrated into one or more pre-determined integration sites of a host cell genome free of sequences from a prokaryotic vector.

II.d Embodiments of the Method According to the Invention

Any known or future TI hosts comprising an exogenous nucleic acid ("landing site") as described above is suitable for performing the current invention.

In the following the method according to the invention is outlined with a CHO cell line. This is presented solely to exemplify the invention but shall not be construed in any way as limitation. The true scope of the invention is set in the claims.

In one preferred embodiment the TI host cell line is a CHO cell.

An exemplary TI host suitable for use in the method according to the invention is a CHO cell line harboring a landing cassette with three heterospecific loxP sites for Cre recombinase mediated DNA recombination, L3, LoxFas and L2 (see Wong et al., 2005 for background). This configuration allows for the simultaneous integration of two plasmids, a front plasmid with an L3 and a LoxFas site and a back plasmid harboring a LoxFas and an L2 site. The functional elements of a selectable marker gene are distributed between both plasmids: promoter and start codon are located on the front plasmid whereas coding region and poly A signal are located on the back plasmid. Only Cre-mediated integration of both plasmids reliably induces resistance against the selectable marker 3. The exogenous nucleic acid also contains a bicistronic Selectable Marker 1-IRES-GFP resistance gene allowing to stabilize the landing cassette by positive selection as well as to select for the absence of the cassette after transfection and Cre-recombination (negative selection). Green fluorescence protein (GFP) serves for monitoring the cassette exchange.

For the expression of a CrossMAb against two antigens, A and B, the genes coding for crossed light chain (xLC) and the crossed heavy chain (xHCknob) are placed on the front plasmid. Both chains together form the Fab fragment against antigen A. The genes coding for the un-crossed light chain (LC) and the un-crossed heavy chain (HChole), which form the Fab fragment against antigen B, are placed on the back plasmid.

For the generation of a library of recombinant CHO cells, each cell expressing a single type of CrossMAb, a library of front plasmids coding for antibody chains against antigen A and a library of back plasmids coding for antibody chains against antigen B are mixed and transfected into the TI host (FIG. 3). Mediated by Cre recombinase, plasmids A and B randomly pair at the target locus. Subsequently, the pool of stably transfected cells is selected with Selectable Marker 2 (positive selection) and 3 (negative selection).

This obtained expression library of CHO cells is subjected to single-cell cloning by methods such as limiting dilution, cell sorting, or cell printing. The resulting single cells or their clonal descendants can be screened for the desired function of the recombinant bispecific antibody.

In order to analyze the identity of integrated plasmids, the antibody coding regions of LC, xLC, HChole and xHCknob were amplified simultaneously by PCR using primers P_1 and P_2 (SEQ ID NO: 01 and 02). P_1 binds in the 5'-untranslated regions of these genes whereas P_2 binds to the 3'-untranslated regions. The resulting mixture of PCR products was analyzed by Sanger sequencing using two gene specific primers. Primer P_3 (SEQ ID NO: 03) binds the constant part of the xHCknob genes and allows for sequencing the VL region of front plasmids. Primer P_4 (SEQ ID NO: 04) binds to the constant part of the LC genes and allows for sequencing the VL region of the back plasmids.

37 out of 39 clones sequenced contained one type of front plasmid and one type of back plasmid (see Table below). One clone (P2F10) contained both back plasmids. In clone P2A09 no front plasmid was detected. With the exception of the back plasmid in clone P2C10, which contained a hybrid sequence of the two employed back plasmids B_1 and B_2, all sequences exactly matched one of the reference sequences. Considering the small number of clones that were analyzed, all transfected plasmids (FIG. 4) and all expected combinations of front and back plasmids occurred with similar frequency (FIG. 5).

| Clone name | Front Plasmid | | Back Plasmid | |
|---|---|---|---|---|
| | F_1 | F_2 | B_1 | B_2 |
| P1A03 | x | | x | |
| P1B03 | x | | | x |
| P1C03 | | x | x | |
| P2A06 | x | | | x |
| P2A07 | x | | x | |
| P2A08 | x | | x | |
| P2A09 | | | | x |
| P2B07 | x | | x | |
| P2B08 | | x | x | |
| P2B09 | | x | | x |
| P2C03 | x | | x | |
| P2C06 | x | | | x |
| P2C07 | | x | x | |
| P2C08 | | x | | x |
| P2C09 | x | | | x |
| P2C10 | | x | | x* |
| P2D06 | x | | x | |
| P2D07 | | x | | x |
| P2D08 | | x | | x |
| P2D09 | | x | | x |
| P2D10 | | x | x | |
| P2D11 | x | | | x |
| P2E06 | x | | x | |
| P2E08 | | x | x | |
| P2E09 | x | | | x |
| P2E10 | x | | | x |
| P2E11 | | x | x | |
| P2F06 | x | | | x |
| P2F07 | | x | x | |
| P2F08 | x | | | x |
| P2F09 | x | | x | |
| P2F10 | x | | x | x |
| P2G06 | x | | x | |
| P2G07 | | x | | x |
| P2G10 | | x | x | |
| P2H06 | x | | x | |
| P2H08 | | x | | x |
| P2H09 | x | | | x |
| P2H10 | x | | | x |

*Hybrid of B_1 and B_2

It has to expressly pointed out that it was absolutely surprising that the representation/occurrence of the different expression plasmids in the obtained clones is the same independent of the sequence of the expressed proteins (antibody chains). No preferred or biased expression of any half-antibody could be detected. This is an important result in view of the intended use of the library for screening. If, for example, one species would occur more often than this could and would negatively influence the screening result.

The present disclosure provides a method for preparing a recombinant host cell library expressing a library of bispecific antibodies comprising:
  a) providing a TI host cell comprising an exogenous nucleotide sequence integrated at a site within a locus of the genome of the host cell, wherein the exogenous nucleotide sequence comprises a first and a second RRS flanking at least one first selection marker, and a third RRS located between the first and the second RRS, and all the RRSs are different;
b) introducing into the cell provided in a) a library of first vectors each comprising two RRSs matching the first and the third RRS on the integrated exogenous nucleotide sequence and flanking two exogenous SOIs and at least one second selection marker, and a library of second vectors each comprising two RRSs matching the second and the third RRS on the integrated exogenous nucleotide sequence and flanking at least two further exogenous SOIs; wherein one of the four SOIs encode the first light chain, the second light chain, the first heavy chain and the second heavy chain of the bispecific antibody;
c) introducing i) either simultaneous with the libraries of first and second vectors of b); or ii) sequentially thereafter one or more recombinases, wherein the one or more recombinases recognize the RRSs of the first and second vectors; wherein the one or more recombinases recognize the RRSs and perform two RMCEs; and
d) selecting for TI cells expressing the second selection marker and secreting a bispecific antibody,
thereby preparing a recombinant host cell library expressing a library of bispecific antibodies.

In one embodiment each of the first and the second vector comprises one SOI encoding an antibody light chain and one SOI encoding an antibody heavy chain.

In one embodiment each of the first and the second vector comprises one SOI encoding an antibody light chain and one SOI encoding the cognate antibody heavy chain.

In one embodiment the first or the second vector comprises one SOI encoding an antibody light chain and one SOI encoding an antibody heavy chain, wherein the SOI encoding the antibody light chain is located upstream (5') to the SOI encoding the antibody heavy chain and the other vector comprises the SOI encoding the antibody heavy chain located upstream (5') to the SOI encoding the antibody light chain.

In one embodiment the first and the second vector comprises one SOI encoding an antibody light chain and one SOI encoding an antibody heavy chain, wherein the SOI encoding the antibody light chain is located upstream (5') to the SOI encoding the antibody heavy chain.

In one embodiment the first and the second vector comprises one SOI encoding an antibody light chain and one SOI encoding an antibody heavy chain, wherein the SOI encoding the antibody heavy chain located upstream (5') to the SOI encoding the antibody light chain.

In one embodiment the first or the second vector comprises one SOI encoding an antibody light chain and one SOI encoding an antibody heavy chain, wherein the antibody light chain and the antibody heavy chain have a domain crossover.

In one embodiment the first vector comprises one SOI encoding an antibody light chain and one SOI encoding an antibody heavy chain, wherein the antibody light chain and the antibody heavy chain have a domain crossover.

In one embodiment the first vector comprises one SOI encoding an antibody light chain and one SOI encoding an antibody heavy chain, wherein the antibody light chain and the antibody heavy chain have a domain crossover and the SOI encoding the antibody heavy chain with domain crossover is located upstream (5') to the SOI encoding the antibody light chain with domain crossover.

In one embodiment the first vector comprises one SOI encoding an antibody light chain and one SOI encoding an antibody heavy chain, wherein the antibody light chain and the antibody heavy chain have a domain crossover and the SOI encoding the antibody heavy chain with domain crossover is located upstream (5') to the SOI encoding the antibody light chain with domain crossover; and the second vector comprises one SOI encoding an antibody light chain and one SOI encoding an antibody heavy chain, wherein the SOI encoding the antibody light chain is located upstream (5') to the SOI encoding the antibody heavy chain.

The present disclosure provides a method for preparing a recombinant host cell expressing a bispecific antibody with domain crossover, comprising:
a) providing a TI host cell comprising an exogenous nucleotide sequence integrated at a site within a locus of the genome of the host cell, wherein the exogenous nucleotide sequence comprises a first and a second RRS flanking at least one first selection marker, and a third RRS located between the first and the second RRS, and all the RRSs are different;
b) introducing into the cell provided in a) a first vector each comprising two RRSs matching the first and the third RRS on the integrated exogenous nucleotide sequence and flanking two exogenous SOIs and at least one second selection marker, and a second vector each comprising two RRSs matching the second and the third RRS on the integrated exogenous nucleotide sequence and flanking at least two further exogenous SOIs; wherein the first vector comprises one SOI encoding an antibody light chain and one SOI encoding an antibody heavy chain, wherein the antibody light chain and the antibody heavy chain have a domain crossover and the SOI encoding the antibody heavy chain with domain crossover is located upstream (5') to the SOI encoding the antibody light chain with domain crossover; and the second vector comprises one SOI encoding an antibody light chain and one SOI encoding an antibody heavy chain, wherein the SOI encoding the antibody light chain is located upstream (5') to the SOI encoding the antibody heavy chain.
c) introducing i) either simultaneous with the first and second vectors of b); or ii) sequentially thereafter one or more recombinases, wherein the one or more recombinases recognize the RRSs of the first and second vectors; and
d) selecting for TI cells expressing the second selection marker and secreting a bispecific antibody,
thereby preparing a recombinant host cell expressing a bispecific antibody with domain crossover.

In one embodiment the first vector comprises a promoter sequence operably linked to the codon ATG, whereby the promoter sequence is flanked upstream by (i.e. positioned downstream to) the (two) exogenous nucleotide sequences and the ATG codon is flanked downstream by (i.e. positioned upstream to) a recombination recognition sequence; and the second vector comprises a selection marker lacking an ATG transcription start codon flanked upstream by a recombination recognition sequence and downstream by the (two) exogenous nucleotide sequences.

The present disclosure provides a method for preparing a recombinant host cell library expressing a library of bispecific antibodies comprising a) providing a TI host cell comprising an exogenous nucleotide sequence integrated at a site within a locus of the genome of the host cell, wherein the exogenous nucleotide sequence comprises a first DNA cassette comprising a first and a second RRS flanking at least one first selection marker, and a third RRS located between the first and the second RRS, and all three RRSs are different;
b) introducing into the cell provided in a) a library of first vectors each comprising a second DNA cassette, wherein the second DNA cassette comprises two (heterospecific) RRSs matching the first and the third RRS of the first DNA cassette and flanking two exogenous SOIs and at least one second selection marker, and a library of second vectors each comprising a third DNA cassette, wherein the third DNA cassette comprises two (heterospecific) RRSs matching the second and the third RRS of the first DNA cassette and flanking at least two further exogenous SOIs; wherein one of the four SOIs encode the first light chain, the second light chain, the first heavy chain and the second heavy chain of the bispecific antibody;
c) introducing i) either simultaneous with the libraries of first and second vectors of b); or ii) sequentially thereafter one or more recombinases, wherein the one or more recombinases recognize the RRSs and perform two RMCEs;
and
d) selecting for TI cells expressing the second selection marker and secreting a bispecific antibody,
thereby preparing a recombinant host cell library expressing a library of bispecific antibodies.

In one embodiment the first vector comprises a promoter sequence operably linked to the codon ATG, whereby the promoter sequence is flanked upstream by (i.e. positioned downstream to) the (two) exogenous nucleotide sequences and the ATG codon is flanked downstream by (i.e. positioned upstream to) a recombination recognition sequence; and the second vector comprises a selection marker lacking an ATG transcription start codon flanked upstream by a recombination recognition sequence and downstream by the (two) exogenous nucleotide sequences.

The recombinant host cell provided with a method according to the invention is also an aspect of the invention. Such a recombinant host cell according to the invention comprises an exogenous nucleotide sequence integrated at a site within a locus of the genome of the host cell,
wherein the exogenous nucleotide sequence comprises the elements
a first, a second and a third recombination recognition sequence,
a two selectable marker, and
a first to fourth expression cassette,
wherein the 5'-to-3' sequences of said elements is
RRS1-1$^{st}$ EC-2$^{nd}$ EC-RRS3-SM-3$^{rd}$ EC-4$^{th}$ EC-RRS2-SM
with
RRS=recombination recognition sequence
EC=expression cassette
SM=selection marker.

The selectable marker between RRS3 and the 3$^{rd}$ EC is SM3.

In one embodiment each of the expression cassettes comprise in 5'-to-3' direction a promoter, a gene of interest and a polyA-site and optionally a terminator sequence.

In one embodiment of all aspects of the invention
i) the first expression cassette comprises in 5'-to-3' direction a promoter, a nucleic acid encoding an antibody heavy chain with domain crossover, and a polyA-site and optionally a terminator sequence,
ii) the second expression cassette comprises in 5'-to-3' direction a promoter, a nucleic acid encoding an antibody light chain with domain crossover, and a polyA-site and optionally a terminator sequence,
iii) the third expression cassette comprises in 5'-to-3' direction a promoter, a nucleic acid encoding an antibody light chain (without domain crossover), and a polyA-site and optionally a terminator sequence, and
iv) the fourth expression cassette comprises in 5'-to-3' direction a promoter, a nucleic acid encoding an antibody heavy chain (without domain crossover), and a polyA-site and optionally a terminator sequence.

In one embodiment of all aspects of the invention the promoter is the human CMV promoter with intron A, the polyA-site is the BGH polyA site and the terminator is the hGT terminator.

In one embodiment of all aspects of the invention the domain crossover is a CH1-CL-crossover or a VH-VL-crossover or a VH/CH1-VL/CL-crossover.

In one embodiment the variable domains of the light chain with domain crossover and the heavy chain with domain crossover form a binding site specifically binding to a first antigen and the variable domains of the light chain without domain crossover and the heavy chain without domain crossover form a binding site specifically binding to a second antigen. In one embodiment the first antigen is a first epitope on an antigen and the second antigen is a second epitope on the antigen that is different from the first epitope. In one embodiment the first antigen and the second antigen are different antigens (polypeptides).

The presently disclosed subject matter also relates to methods of producing a polypeptide of interest comprising:
a) providing a recombinant (host) cell according to the invention or prepared with a method as described herein;
b) culturing the recombinant (host) cell in a) under conditions suitable for expressing the SOI and recovering a polypeptide of interest from the cell or the cultivation medium.

In one embodiment the TI host cell is a CHO cell. Any CHO cell can be used as a host as all comprise the seven loci identified above.

The resulting recombinant (host) cell can be used in methods for the recombinant production of a bispecific antibody, whereby the expression of the bispecific antibody of interest is facilitated.

In certain embodiments, the present disclosure provides a method of preparing a TI host cell expressing a first and second pair of an antibody light chain and an antibody heavy chain that comprises:
a) providing a TI host cell comprising an exogenous nucleotide sequence integrated at a site within a locus of the genome of the host cell, wherein the exogenous nucleotide sequence comprises a first and a second RRS flanking at least one first selection marker, and a third RRS located between the first and the second RRS, and all the RRSs are different;
b) introducing into the cell provided in a) a first vector comprising two RRSs matching the first and the third RRS on the integrated exogenous nucleotide sequence and flanking at least the exogenous SOIs encoding the first pair of an antibody light chain and an antibody heavy chain and at least one second selection marker;

c) introducing into the cell provided in a) or obtained in b) a second vector comprising two RRSs matching the second and the third RRS on the integrated exogenous nucleotide sequence and flanking at least the exogenous SOIs encoding the second pair of an antibody light chain and an antibody heavy chain;

d) introducing one or more recombinases, wherein the one or more recombinases recognize the RRSs into the cell obtained in b) or c); and e) selecting for TI cells expressing the second selection marker to thereby isolate a TI host cell expressing the first and second polypeptides of interest.

Although the above is presented for a bispecific antibody the sequence of interest can encode any polypeptide of interest, including but not limited to the examples listed herein. The SOIs can be the same or they can be different, for example the SOIs can include coding sequences to both chains of an antibody.

In certain embodiments, the operably linked nucleotide sequence increases the expression level of the SOI compared to a randomly integrated SOI. In certain embodiments, the integrated exogenous SOI is expressed at about 20%, 30%, 40%, 50%, 100%, 2 fold, 3 fold, 5 fold, or 10 fold higher than a randomly integrated SOI.

In certain embodiments, an integrated exogenous nucleotide sequence comprises an SOI encoding an antibody heavy chain sequence or fragment thereof and an SOI encoding an antibody light chain sequence or fragment thereof. In certain embodiments, an integrated exogenous nucleotide sequence comprises an SOI encoding a first antibody heavy chain sequence or fragment thereof, an SOI encoding a second antibody heavy chain sequence or fragment thereof, and an SOI encoding an antibody light chain sequence or fragment thereof. In certain embodiments, an integrated exogenous nucleotide sequence comprises an SOI encoding a first antibody heavy chain sequence or fragment thereof, an SOI encoding a second antibody heavy chain sequence or fragment thereof, an SOI encoding a first antibody light chain sequence or fragment thereof and an SOI encoding a second antibody light chain sequence or fragment thereof. In certain embodiments, the individual SOIs encoding heavy and light chain sequences can be integrated, e.g., into a single exogenous nucleic acid sequence present at a single integration site, or into multiple exogenous nucleic acid sequences present at a single integration site.

In certain embodiments, the integrated exogenous nucleotide sequence comprises three RRSs and four exogenous SOIs, and the third RRS is located between the first and the second RRS. In certain embodiments, the first and the second SOI are located between the first and the third RRS, and the third and the fourth SOI are located between the third and the second RRS. In certain embodiments, the first and the second SOI are different. In certain embodiments, the first and the second RRS are the same and the third RRS is different from the first or the second RRS. In certain embodiments, all three RRSs are different. In certain embodiments, the first RRS is a LoxP L3 site, the second RRS is a LoxP 2L site, and the third RRS is a LoxFas site. In certain embodiments, the integrated exogenous nucleotide sequence comprises three RRSs, four exogenous SOIs, and one selection marker. In certain embodiments, the first and the second SOI and the selection marker are located between the first and the third RRS, and the third and the fourth SOI are located between the third and the second RRS.

The recombinant host cells of the present disclosure can be used for the regulated expression of any molecule of interest, especially a bispecific antibody. In certain embodiments, the host cells of the present disclosure can be used for the expression of polypeptides, e.g., mammalian polypeptides. Non-limiting examples of such polypeptides include hormones, receptors, fusion proteins, regulatory factors, growth factors, complement system factors, enzymes, clotting factors, anti-clotting factors, kinases, cytokines, CD proteins, interleukins, therapeutic proteins, diagnostic proteins and antibodies. In certain embodiments, the host cells of the present disclosure can be used for the expression of chaperones, protein modifying enzymes, shRNA, gRNA or other proteins or peptides while expressing a therapeutic protein or molecule of interest constitutively or regulated.

In certain embodiments, the polypeptide of interest is a bi-specific, tri-specific or multi-specific polypeptide, e.g. a bi-specific antibody, especially a full-length four chain bispecific antibody with domain crossover in one light chain-heavy chain pair.

The recombinant host cells of the present disclosure can be employed in the production of large quantities of a molecule of interest, e.g. of a bispecific antibody, especially with domain crossover, in a shorter timeframe as compared to non-TI cells used in current cell culture methods. In certain embodiments, the recombinant host cells of the present disclosure can be employed for improved quality of the molecule of interest as compared to non-TI cells used in current cell culture methods.

The following examples and figures are provided to aid the understanding of the present invention, the true scope of which is set forth in the appended claims. It is understood that modifications can be made in the procedures set forth without departing from the spirit of the invention.

DESCRIPTION OF THE FIGURES

FIG. 4A: Map of front plasmid F_1 coding for xHCknob and xLC of antibody 1. FIG. 4B: Map of back plasmid B_1 coding for HChole and LC of antibody 2. BGH Poly A: 3' UTR and polyadenylation signal of the bovine growth hormone gene, HGT: transcription termination sequence of the human growth hormone gene.

FIG. 5A: Prevalence of front and back plasmids among 36 titer positive single cell clones. Clones P2A09, P2C10 and P2F10 with unexpected target gene configurations are not included. FIG. 5B: Prevalence of combinations of front and back plasmids among 36 titer positive single cell clones. Clones P2A09, P2C10 and P2F10 with unexpected target gene configuration are not included.

FIG. 6A: parental CHO cells
FIG. 6B: TI host cells
FIG. 6C: stable pool that expresses a 2×2 CrossMab library.

CITED LITERATURE

Brinkmann, U. and Kontermann, R. E. MAbs. 9 (2017) 182-212.
Kitazawa, T., et al., Nat. Med. 18 (2012) 1570-1574.
Lanza, A. M., et al., Biotechnol. J. 7 (2012) 898-908.
Merchant, A. M., et al., Nat. Biotechnol. 16 (1998) 677-681.
Regula, J. T., et al., Protein Engineering, Design and Selection (2018) gzy021, doi(dot)org/10.1093/protein/gzy021
Sampei, Z., et al., PLoS. One. 8 (2012) e57479.
Schaefer, W., et al., Proc. Natl. Acad. Sci. U.S.A. 108 (2011) 11187-11192.
Shima, M., et al., N. Engl. J. Med. 374 (2016) 2044-2053.
Turan, S., J. Mol. Biol. 407 (2011) 193-221.
Wong, E. T., et al., Nucleic Acids Res. 33 (2005) e147.
Zhang, H., et al., Proc. Natl. Acad. Sci. U.S.A. 109 (2012) 15728-15733.

Example 1

General Techniques
Recombinant DNA Techniques

Standard methods were used to manipulate DNA as described in Sambrook et al., Molecular Cloning: A Laboratory Manual, Second Edition, Cold Spring Harbor Laboratory Press, Cold Spring Harbor, N.Y, (1989). The molecular biological reagents were used according to the manufacturer's instructions.

DNA Sequence Determination

DNA sequencing was performed at SequiServe GmbH (Vaterstetten, Germany)

DNA and Protein Sequence Analysis and Sequence Data Management

The EMBOSS (European Molecular Biology Open Software Suite) software package and Invitrogen's Vector NTI version 11.5 were used for sequence creation, mapping, analysis, annotation and illustration.

Example 2

Generation and Analysis of a Combinatorial 2×2 CrossMAb Expression Library

Figure 1:
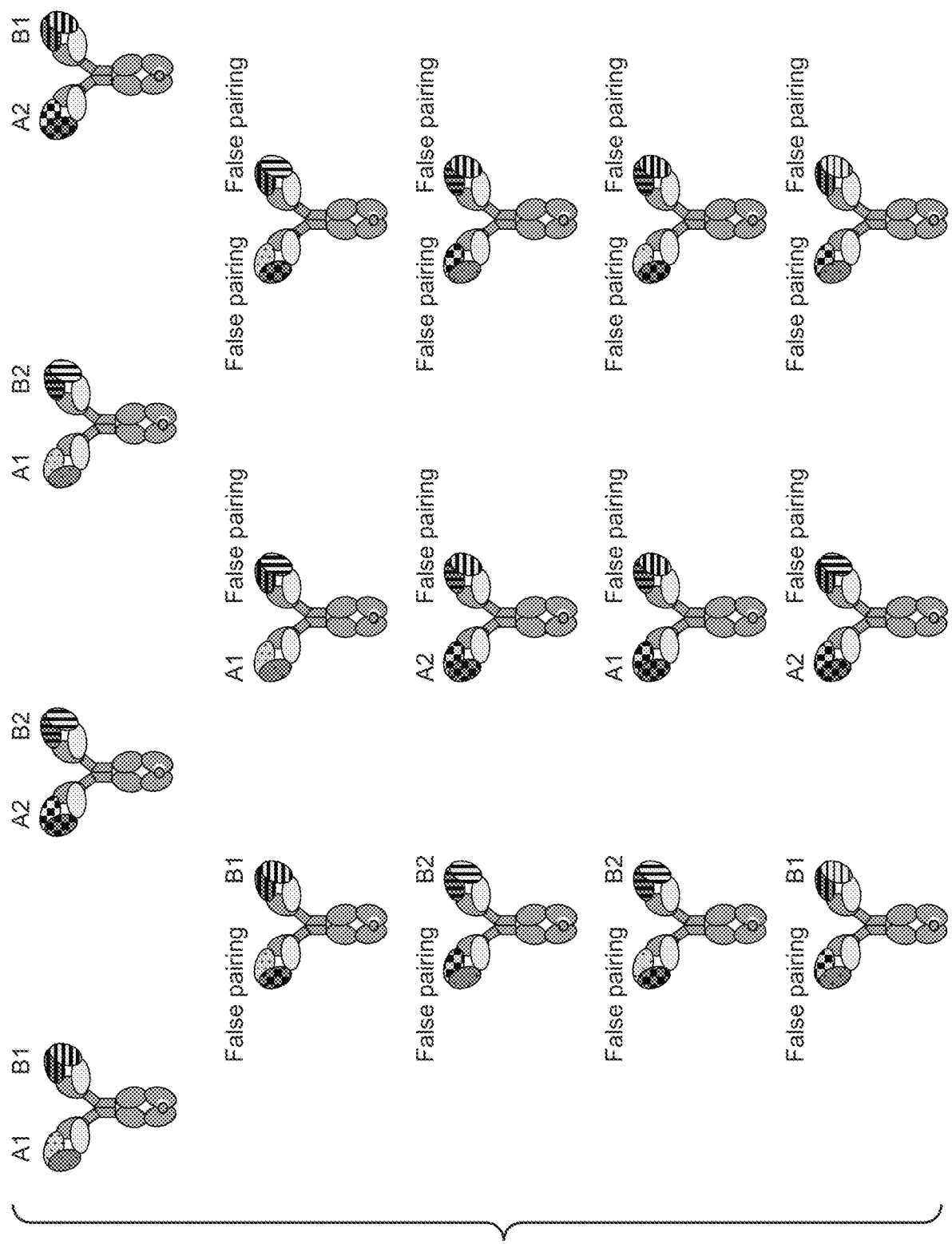
FIG. 1: CrossMabs resulting from random association of subunits of two functional xLC-xHCknob pairs A1 and A2 against antigen A and two functional LC-HChole pairs against antigen B; besides four CrossMabs with two functional Fabs, 12 CrossMabs that are partially or completely dysfunctional are generated due to mispairing of light and heavy chains.
Figure 2:
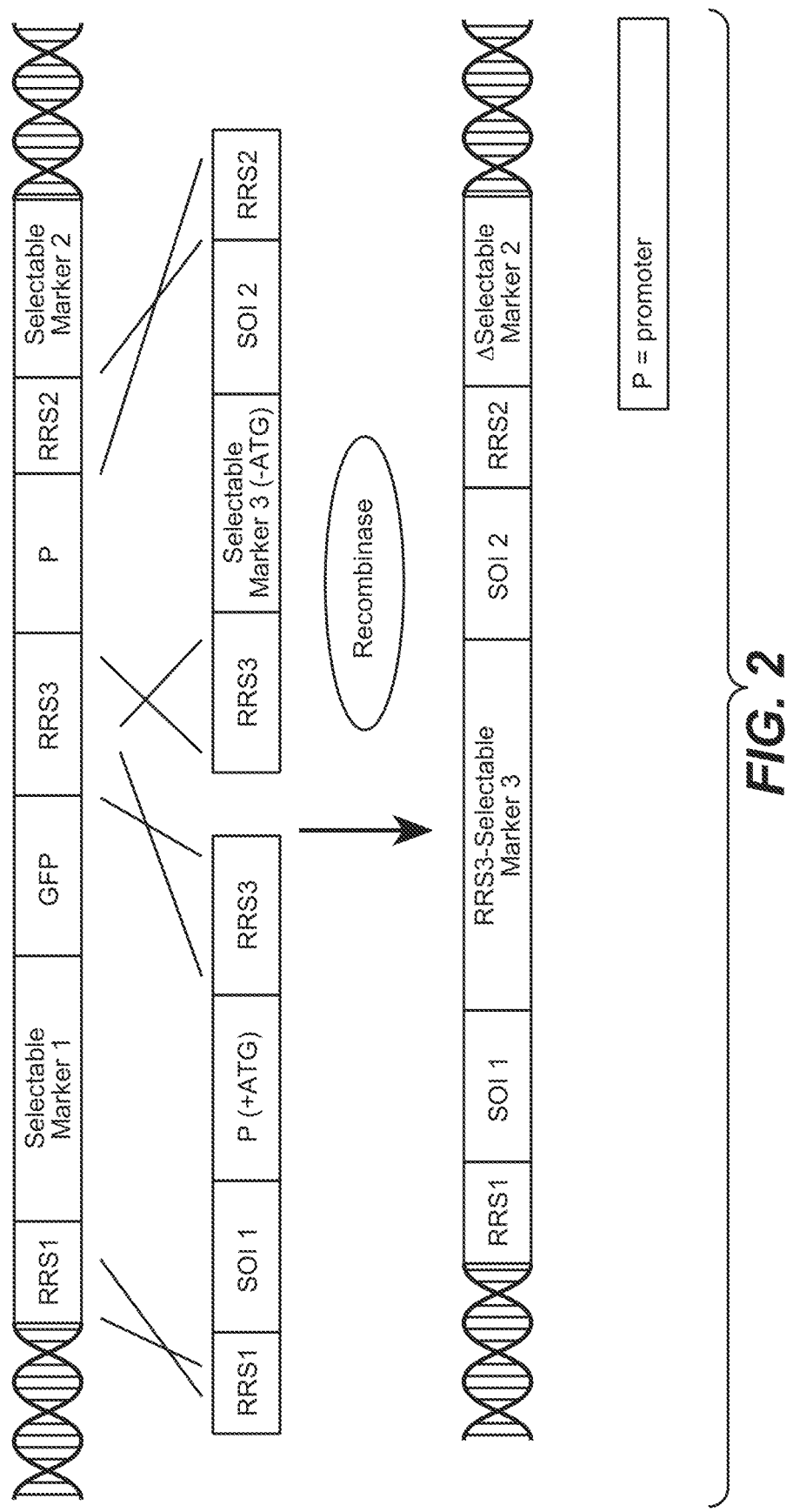
FIG. 2: Scheme of a two-plasmid RMCE strategy involving the use of three RRS sites to carry out two independent RMCEs simultaneously.
Figure 3:
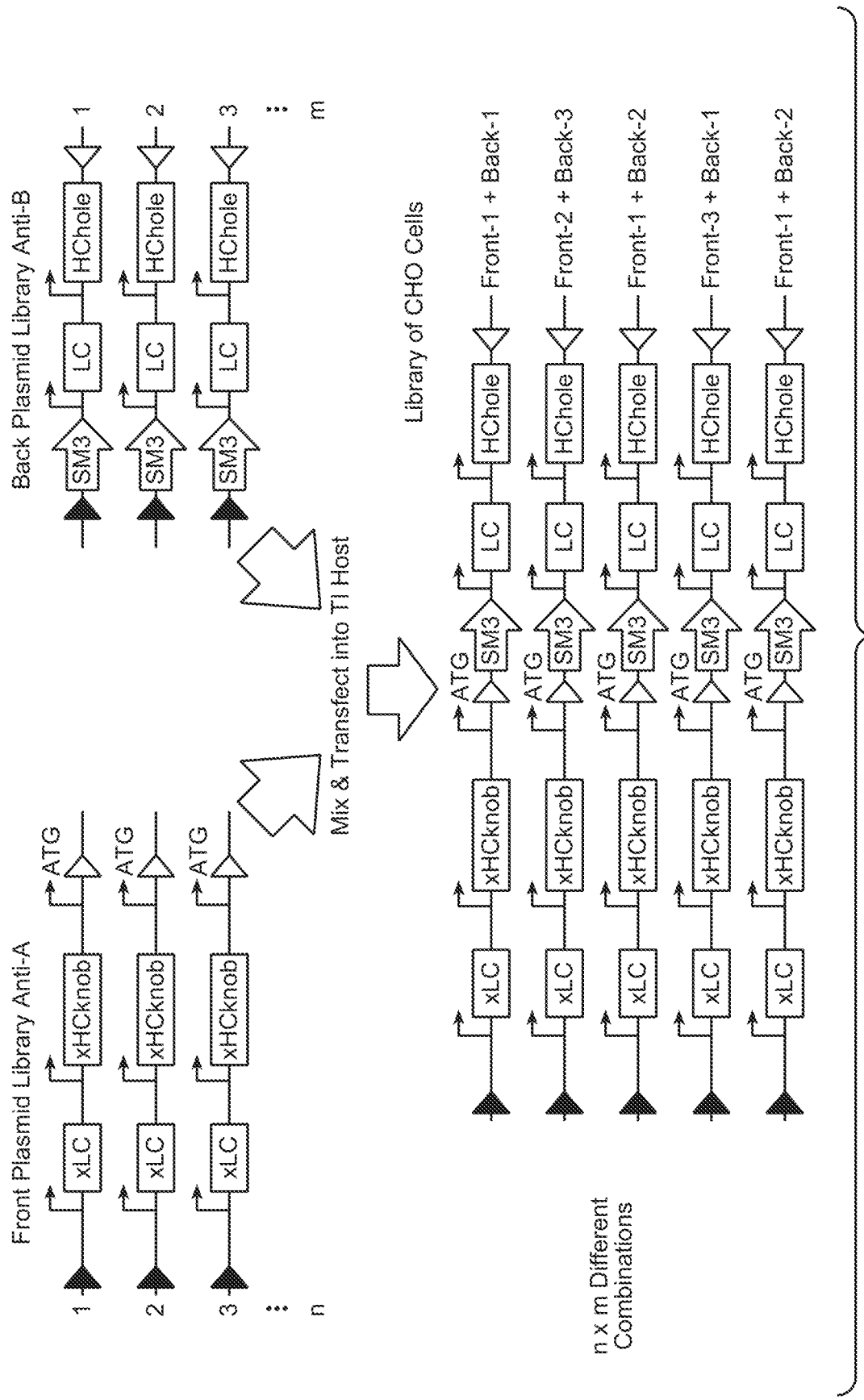
FIG. 3: Generation of a combinatorial CrossMab library in a targeted integration CHO host cell line. A libraries of n different front plasmids against antigen A and m different back plasmids against antigen B are mixed and transfected into TI CHO host cell line. The resulting pool of stably transfected cells expresses n×m different CrossMabs with each cell expressing only one type.
Figure 4A:
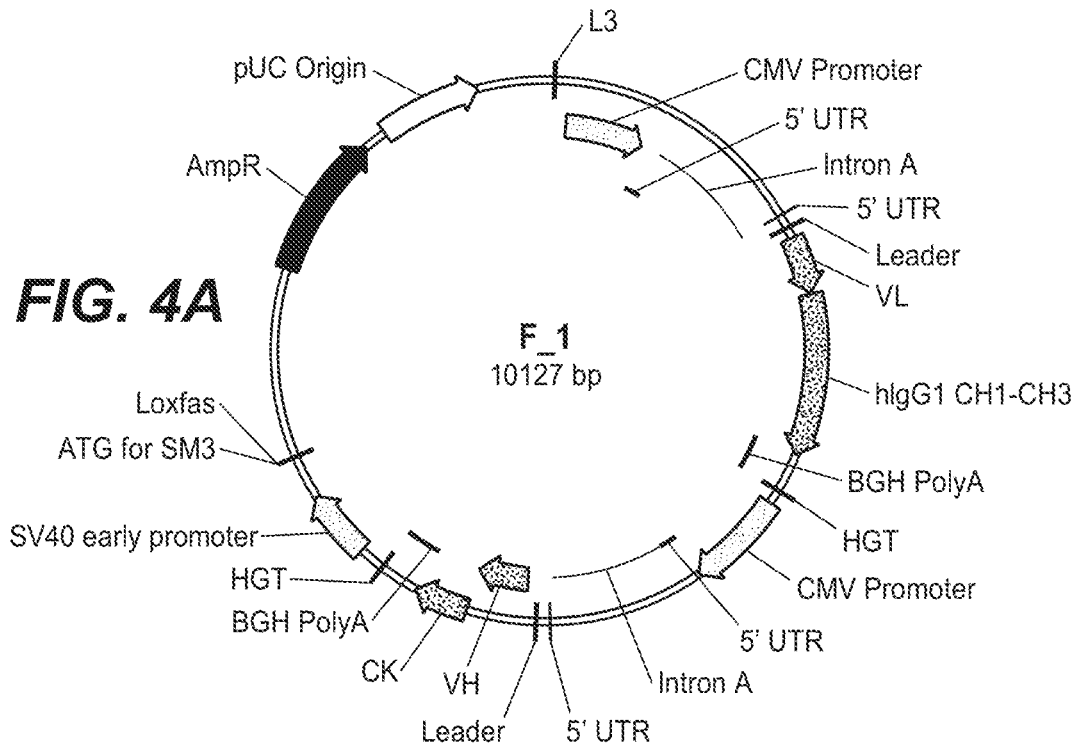
FIGS. 4A, 4B.
Figure 4B:
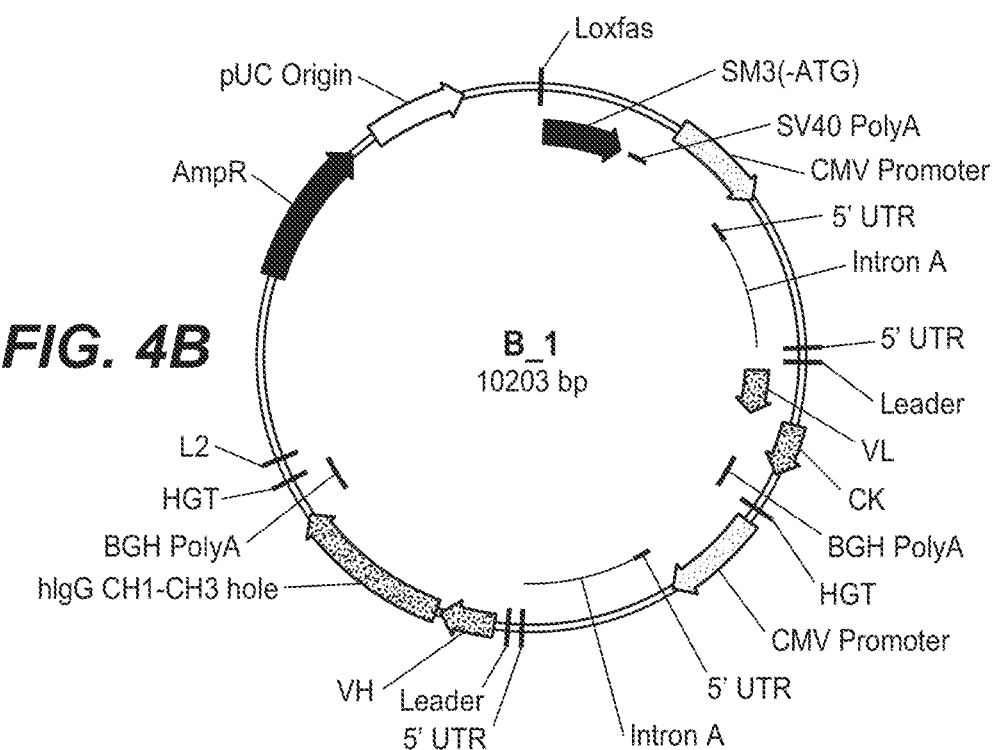

Two front plasmids, F_1 and F_2, coding for crossed antibody chains of two different antibodies specifically binding to human antigen A and two back plasmids, B_1 and B_2 coding for uncrossed antibody chains of two different antibodies specifically binding to human antigen B were simultaneously transfected into TI CHO host cell line (see table below). FIG. 4 shows the maps of front plasmid F_1 and back plasmid B_1. Front plasmids F_1 and F_2 differ from each other in the amino acid sequences of VL and VH. The same is true for and back plasmids B_1 and B_2.

Figures 6A, 6B, 6C:
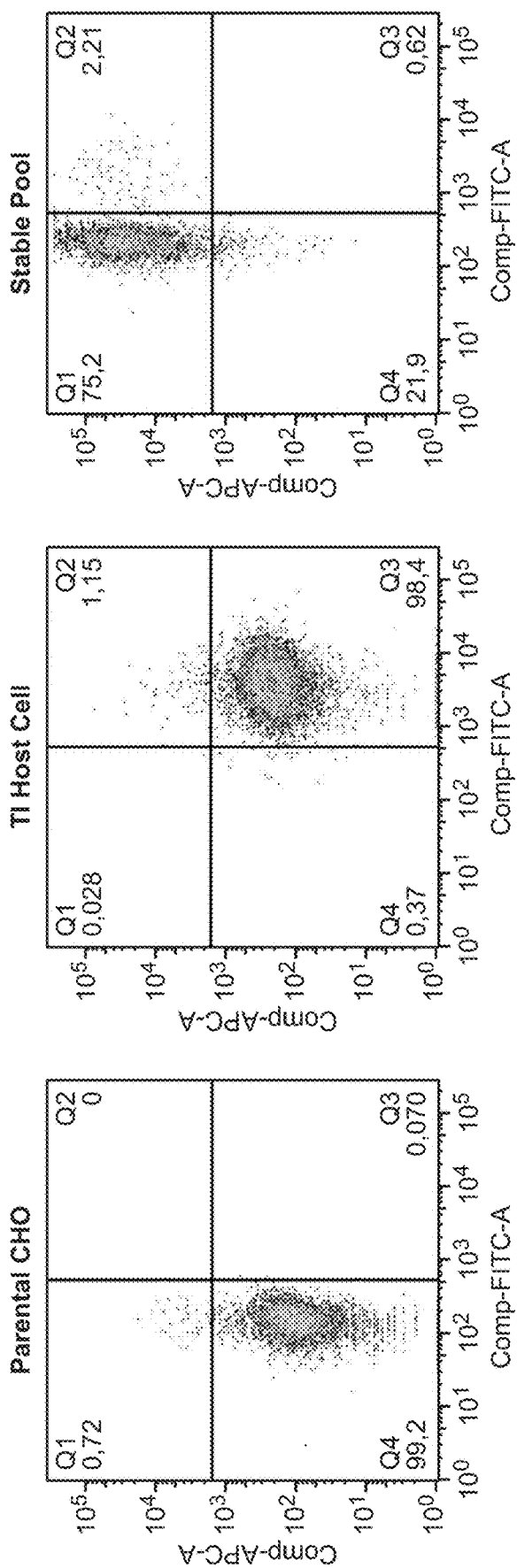
FIGS. 6A, 6B and 6C: Cytometric measurement of GFP (x-axis) and antibody expression (y-axis). Cytometry was performed 10 days after selection had been started.

| Plasmid | Plasmid type | Specificity | Type of CrossMAb genes |
|---------|--------------|-------------|------------------------|
| F_1 | front | antigen A | xHCknob, xLC (first VH/VL pair) |
| F_2 | front | antigen A | xHCknob, xLC (second VH/VL pair) |
| B_1 | back | antigen B | LC, HChole (third VH/VL pair) |
| B_2 | back | antigen B | LC, HChole (fourth VH/VL pair) | xHCknob: heavy chain with domain crossover and knob mutations
xLC: light chain with domain crossover
LC: light chain without domain crossover
HChole: heavy chain without domain crossover and hole mutations TI host were propagated in disposable 125 ml vented shake flasks under standard humidified conditions (95% rH, 37° C., and 5% $CO_2$) at a constant agitation rate of 150 rpm. Every 3-4 days the cells were seeded in chemically defined medium containing selection marker 1 and selection marker 2 in effective concentrations with a concentration of $3×10^5$ cells/ml. Density and viability of the cultures were measured with a Cedex HiRes cell counter (F. Hoffmann-La Roche Ltd, Basel, Switzerland). For stable transfection, equimolar amounts of plasmids F_1, F_2, B_1 and B_2 were mixed. 1 µg Cre expression plasmid was added to 5 µg of the plasmid mixture. Two days prior to transfection TI host cells were seeded in fresh medium with a density of $4×10^5$ cells/ml. Transfection was performed with the Nucleofector device using the Nucleofector Kit V (Lonza, Switzerland), according to the manufacturer's protocol. $3×10^7$ cells were transfected with 30 µg plasmid. After transfection the cells were seeded in 30 ml medium without selection agents. On day 5 after seeding the cells were centrifuged and transferred to 80 mL medium containing selection agent 3 and selection agent 4 at effective concentrations at $6×10^5$ cells/ml for selection of recombinant cells. Cell density and viability of the culture was monitored regularly. When the viability of the culture started to increase again, the concentrations of selection agents 3 and 4 were reduced to about half the amount used before. 10 days after starting selection, the success of Cre mediated cassette exchange was checked by flow cytometry measuring the expression of intracellular GFP and extracellular CrossMab bound to the cell surface (FIG. 6). An APC antibody (allophycocyanin-labeled F(ab')2 Fragment goat anti-human IgG) against human antibody light and heavy chain was for FACS staining. Flow cytometry was performed with a BD FACS Canto II flow cytometer (BD, Heidelberg, Germany). 10,000 events per sample were measured. Living cells were gated in a plot of forward scatter (FSC) against side scatter (SSC). The live cell gate was defined with non-transfected TI host cells and applied to all samples by employing the FlowJo 7.6.5 EN software (TreeStar, Olten, Switzerland). Fluorescence of GFP was quantified in the FITC channel (excitation at 488 nm, detection at 530 nm). CrossMab measured in the APC channel (excitation at 645 nm, detection at 660 nm). Parental CHO cells, i.e. those cells used for the generation of the TI host cell, were used as a negative control with regard to GFP and CrossMab expression. Fourteen days after the selection had been started, the viability exceeded 90% and selection was considered as complete.

After selection, the pool of stably transfected cells was subjected to single-cell cloning by limiting dilution. For this purpose, cells were stained with Cell Tracker Green™ (Thermo Fisher Scientific, Waltham, MA) and plated in 384-well plates with 0.6 cells/well. For single-cell cloning and all further cultivation steps selection agent 4 was omitted from the medium. Wells containing only one cell were identified by bright field and fluorescence based plate imaging. Only wells that contained one cell were further considered. Approximately three weeks after plating colonies were picked from confluent wells and further cultivated in 96-well plates. After four days in 96-well plates, the antibody titers in the culture medium were measured with an anti-human IgG sandwich ELISA. In brief, antibodies were captured from the cell culture fluid with an anti-human Fc antibody bound to a MaxiSorp microtiter plate (Nunc™, Sigma-Aldrich) and detected with an anti-human Fc POD conjugate which binds to an epitope different from the capture antibody. The secondary antibody was quantified by chemiluminescence employing the BM Chemiluminescence ELISA Substrate (POD) (Sigma-Aldrich). 91% of the wells showed cell growth and were antibody positive. Antibody-positive colonies were lysed and genomic DNA was extracted using the Allprep DNA/RNA Mini Kit (Qiagen, Hilden, Germany).

In order to analyze the identity of integrated plasmids, the antibody coding regions of LC, xLC, HChole and xHCknob were amplified simultaneously by PCR using primers P_1 and P_2. P_1 binds in the 5'-untranslated regions of these genes whereas P_2 binds to the 3'-untranslated regions. The resulting mixture of PCR products was analyzed by Sanger sequencing using two gene specific primers. P_3 binds the constant part of the xHCknob genes and allows for sequencing the VL region of front plasmids. P_4 binds to the constant part of the LC genes and allows for sequencing the VL region of the back plasmids.

Figure 5A:
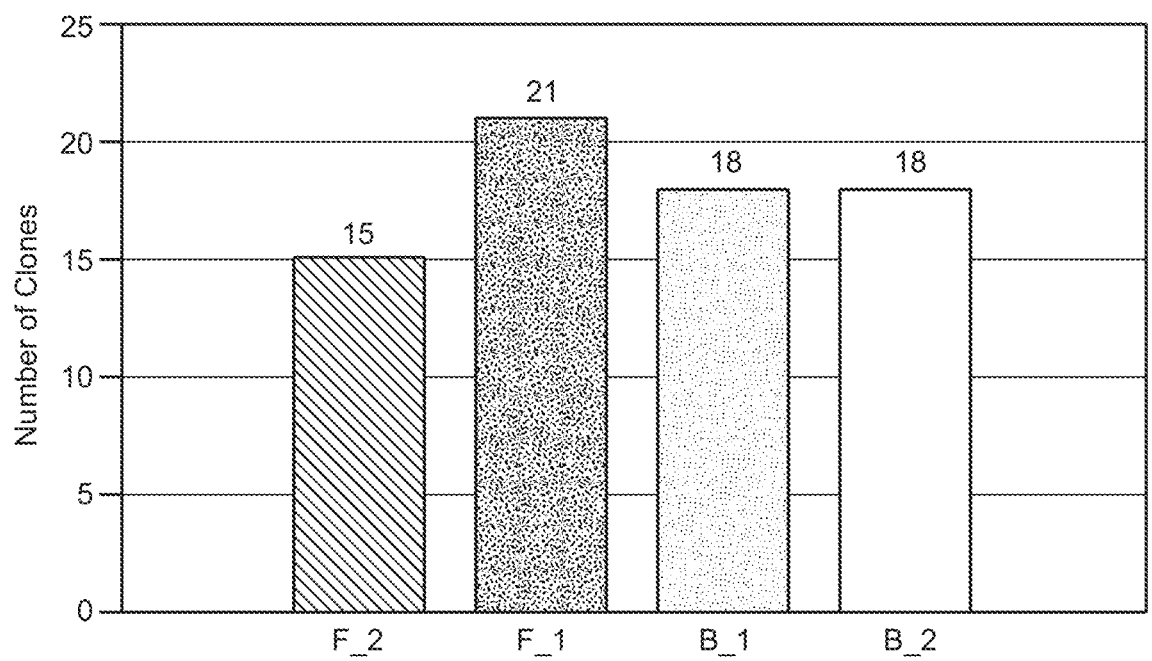
FIGS. 5A, 5B.
Figure 5B:
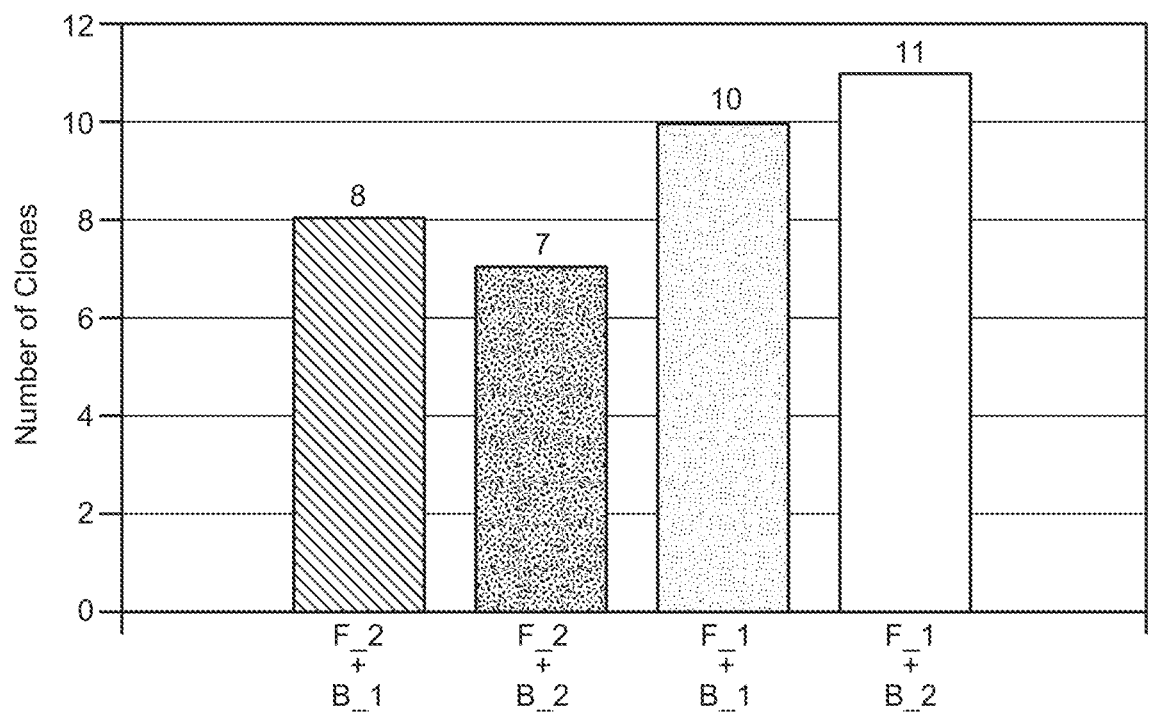

37 out of 39 clones sequenced contained one type of front plasmid and one type of back plasmid (see table below). One clone (P2F10) contained both back plasmids. In clone P2A09 no front plasmid was detected. With the exception of the back plasmid in clone P2C10, which contained a hybrid sequence of back plasmids B_1 and B_2, all sequences exactly matched one of the reference sequences. Considering the small number of clones that were analyzed, all transfected plasmids (FIG. 4) and all expected combinations of front and back plasmids occurred with similar frequency (FIG. 5).

| Clone name | Front Plasmid | | Back Plasmid | |
|---|---|---|---|---|
| | F_1 | F_2 | B_1 | B_2 |
| P1A03 | x | | x | |
| P1B03 | x | | | x |
| P1C03 | | x | x | |
| P2A06 | x | | | x |
| P2A07 | x | | x | |
| P2A08 | x | | x | |
| P2A09 | | | | x |
| P2B07 | x | | x | |
| P2B08 | | x | x | |
| P2B09 | | x | | x |
| P2C03 | x | | x | |
| P2C06 | x | | | x |
| P2C07 | | x | x | |
| P2C08 | | x | | x |
| P2C09 | x | | | x |
| P2C10 | | x | | x* |
| P2D06 | x | | x | |
| P2D07 | | x | | x |
| P2D08 | | x | | x |
| P2D09 | | x | | x |
| P2D10 | | x | x | |
| P2D11 | x | | | x |
| P2E06 | x | | x | |
| P2E08 | | x | x | |
| P2E09 | x | | | x |
| P2E10 | x | | | x |
| P2E11 | | x | x | |
| P2F06 | x | | | x |
| P2F07 | | x | x | |
| P2F08 | x | | | x |
| P2F09 | x | | x | |
| P2F10 | x | | x | x |
| P2G06 | x | | x | |
| P2G07 | | x | | x |
| P2G10 | | x | x | |
| P2H06 | x | | x | |
| P2H08 | | x | | x |
| P2H09 | x | | | x |
| P2H10 | x | | | x |

*Hybrid of B_1 and B_2

It has to expressly pointed out that it was absolutely surprising that the representation/occurrence of the different expression plasmids in the obtained clones is the same independent of the sequence of the expressed proteins (antibody chains). No preferred or biased expression of any half-antibody could be detected. This is an important result in view of the intended use of the library for screening. If, for example, one species would occur more often than this could and would negatively influence the screening result.

What is claimed is:

1. A method for preparing a recombinant host cell library expressing a library of bispecific antibodies comprising:

a) providing a targeted integration host cell comprising an exogenous nucleotide sequence integrated at a site within a locus of the genome of the host cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different;

b) introducing into the cell provided in a) a library of first vectors each comprising two recombination recognition sequences matching the first and the third recombination recognition sequence on the integrated exogenous nucleotide sequence and flanking two exogenous nucleotide sequences and at least one second selection marker, and a library of second vectors each comprising two recombination recognition sequences matching the second and the third recombination recognition sequence on the integrated exogenous nucleotide sequence and flanking at least two further exogenous nucleotide sequences;

wherein one of the four exogenous nucleotide sequences encode a first light chain, one a second light chain, one a first heavy chain and one a second heavy chain of the bispecific antibody; and wherein the first vector or the second vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody heavy chain with domain crossover is located upstream of the exogenous nucleotide sequence encoding the antibody light chain with domain crossover;

c) introducing i) either simultaneous with the libraries of first and second vectors of b); or
  ii) sequentially thereafter one or more recombinases, wherein the one or more recombinases recognize the recombination recognition sequences of the first and second vectors; wherein the one or more recombinases recognize the recombination recognition sequences and perform two recombinase mediated cassette exchanges;
and d) selecting for recombinant host cells expressing the second selection marker and secreting a bispecific antibody, thereby preparing a recombinant host cell library expressing a library of bispecific antibodies.

2. The method according to claim 1, wherein each of the first and the second vector comprises one exogenous nucleotide sequence encoding an antibody light chain and one exogenous nucleotide sequence encoding an antibody heavy chain.

3. The method according to claim 1, wherein each of the first and the second vector comprises one exogenous nucleotide sequence encoding an antibody light chain and one exogenous nucleotide sequence encoding the cognate antibody heavy chain.

4. The method according to claim 1, wherein the first or the second vector comprises one exogenous nucleotide sequence encoding an antibody light chain and one exogenous nucleotide sequence encoding an antibody heavy chain, wherein the exogenous nucleotide sequence encoding the antibody light chain is located upstream of the exogenous nucleotide sequence encoding the antibody heavy chain and the other vector comprises the exogenous nucleotide sequence encoding the antibody heavy chain located upstream of the exogenous nucleotide sequence encoding the antibody light chain.

5. The method according to claim 1, wherein the first and the second vector comprises one exogenous nucleotide sequence encoding an antibody light chain and one exogenous nucleotide sequence encoding an antibody heavy chain, wherein the exogenous nucleotide sequence encoding the antibody light chain is located upstream the exogenous nucleotide sequence encoding the antibody heavy chain.

6. The method according to claim 1, wherein the first and the second vector comprises one exogenous nucleotide sequence encoding an antibody light chain and one exogenous nucleotide sequence encoding an antibody heavy chain, wherein the exogenous nucleotide sequence encoding the antibody heavy chain located upstream of the exogenous nucleotide sequence encoding the antibody light chain.

7. The method according to claim 1, wherein the first and the second vector comprises one exogenous nucleotide sequence encoding an antibody light chain and one exogenous nucleotide sequence encoding an antibody heavy chain, wherein the exogenous nucleotide sequence encoding the antibody light chain is located upstream of the exogenous nucleotide sequence encoding the antibody heavy chain in one vector and the exogenous nucleotide sequence encoding the antibody heavy chain is located upstream of the exogenous nucleotide sequence encoding the antibody light chain in the other vector.

8. The method according to claim 1, wherein the first or the second vector comprises one exogenous nucleotide sequence encoding an antibody light chain and one exogenous nucleotide sequence encoding an antibody heavy chain, wherein the antibody light chain and the antibody heavy chain have a domain crossover.

9. The method according to claim 1, wherein the first vector comprises one exogenous nucleotide sequence encoding an antibody light chain and one exogenous nucleotide sequence encoding an antibody heavy chain, wherein the antibody light chain and the antibody heavy chain have a domain crossover.

10. The method according to claim 1, wherein the first vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody heavy chain with domain crossover is located upstream of the exogenous nucleotide sequence encoding the antibody light chain with domain crossover; and the second vector comprises one exogenous nucleotide sequence encoding an antibody light chain and one exogenous nucleotide sequence encoding an antibody heavy chain, wherein the exogenous nucleotide sequence encoding the antibody light chain is located upstream of the exogenous nucleotide sequence encoding the antibody heavy chain.

11. A method for preparing a recombinant host cell expressing a bispecific antibody with domain crossover, comprising:
  a) providing a targeted integration host cell comprising an exogenous nucleotide sequence integrated at a site within a locus of the genome of the host cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different;
  b) introducing into the cell provided in a) a first vector each comprising two recombination recognition sequences matching the first and the third recombination recognition sequence on the integrated exogenous nucleotide sequence and flanking two exogenous nucleotide sequences and at least one second selection marker, and a second vector each comprising two recombination recognition sequences matching the second and the third recombination recognition sequence on the integrated exogenous nucleotide sequence and flanking at least two further exogenous nucleotide sequences; wherein the first vector comprises one exogenous nucleotide sequence encoding an antibody light chain and one exogenous nucleotide sequence encoding an antibody heavy chain, wherein the antibody light chain and the antibody heavy chain have a domain crossover and the exogenous nucleotide sequence encoding the antibody heavy chain with domain crossover is located upstream of the exogenous nucleotide sequence encoding the antibody light chain with domain crossover; and the second vector comprises one exogenous nucleotide sequence encoding an antibody light chain and one exogenous nucleotide sequence encoding an antibody heavy chain, wherein the exogenous nucleotide sequence encoding the antibody light chain is located upstream of the exogenous nucleotide sequence encoding the antibody heavy chain,
  c) introducing i) either simultaneous with the first and second vectors of b); or ii) sequentially thereafter one or more recombinases, wherein the one or more recombinases recognize the recombination recognition sequences of the first and second vectors;
  and
  d) selecting for recombinant host cells expressing the second selection marker and secreting a bispecific antibody,
thereby preparing a recombinant host cell expressing a bispecific antibody with domain crossover.

12. The method according to claim 1, wherein the first vector comprises a promoter sequence operably linked to the codon ATG, whereby the promoter sequence is flanked upstream by the two exogenous nucleotide sequences and the ATG codon is flanked downstream by a recombination recognition sequence; and the second vector comprises a selection marker lacking an ATG transcription start codon flanked upstream by a recombination recognition sequence and downstream by the two exogenous nucleotide sequences.

13. A method of producing a bispecific antibody comprising:
  a) providing a recombinant host cell prepared with a method according to claim 1;
  b) culturing the recombinant host cell in a) and recovering the bispecific antibody from the cell or the cultivation medium.

* * * * *